(12) United States Patent
Kim et al.

(10) Patent No.: US 12,194,476 B2
(45) Date of Patent: Jan. 14, 2025

(54) METAL AIR FILTER

(71) Applicant: KOREA ADVANCED INSTITUTE OF SCIENCE AND TECHNOLOGY, Daejeon (KR)

(72) Inventors: San Ha Kim, Daejeon (KR); SeungHun Yoo, Daejeon (KR); Inyeong Yang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 404 days.

(21) Appl. No.: 17/626,412

(22) PCT Filed: Oct. 5, 2021

(86) PCT No.: PCT/KR2021/013631
§ 371 (c)(1),
(2) Date: Jan. 11, 2022

(87) PCT Pub. No.: WO2022/080735
PCT Pub. Date: Apr. 21, 2022

(65) Prior Publication Data
US 2022/0371027 A1     Nov. 24, 2022

(30) Foreign Application Priority Data

Oct. 13, 2020 (KR) .................. 10-2020-0131701
Sep. 6, 2021 (KR) .................. 10-2021-0118602

(51) Int. Cl.
| | | |
|---|---|---|
| *B03C 3/60* | (2006.01) |
| *B01D 39/20* | (2006.01) |
| *B03C 3/38* | (2006.01) |
| *B03C 3/47* | (2006.01) |
| *C25D 3/38* | (2006.01) |
| *C25D 5/00* | (2006.01) |
| *C25D 5/50* | (2006.01) |
| *C25D 7/00* | (2006.01) |

(52) U.S. Cl.
CPC ............ *B03C 3/60* (2013.01); *B01D 39/2027* (2013.01); *B01D 39/2041* (2013.01); *B03C 3/38* (2013.01);
(Continued)

(58) Field of Classification Search
None
See application file for complete search history.

(56) References Cited

U.S. PATENT DOCUMENTS

| | | | | |
|---|---|---|---|---|
| 4,655,797 A * | 4/1987 | Iniotakis | .................. | C25D 7/00 55/525 |
| 2010/0024653 A1 * | 2/2010 | Nutsos | .................... | B03C 3/155 55/528 |

(Continued)

FOREIGN PATENT DOCUMENTS

| | | | | |
|---|---|---|---|---|
| JP | 8-220320 | * | 8/1996 | ............... G02B 5/20 |
| JP | 08-220320 A | | 8/1996 | |

(Continued)

OTHER PUBLICATIONS

English language machine translation for JP 2003-164716. Retrieved from translationportal.epo.org on Apr. 15, 2024. (Year: 2024).*

(Continued)

*Primary Examiner* — Jason M Greene
(74) *Attorney, Agent, or Firm* — Tarolli, Sundheim, Covell & Tummino LLP

(57) ABSTRACT

The present disclosure relates to a metal air filter including: a filter which is formed of a metallic material by electrodeposition and has a nano branch structure; an ionizer which conducts particles to be captured by the filter with negative charges; and a power supply which supplies a positive voltage for conducting the filter with positive charges and a (Continued)

negative voltage for the ionizer. The filter can be more simply manufactured at a lower cost than a conventional process.

21 Claims, 26 Drawing Sheets

(52) U.S. Cl.
CPC ............... *B03C 3/47* (2013.01); *C25D 3/38* (2013.01); *C25D 5/50* (2013.01); *C25D 5/605* (2020.08); *C25D 7/00* (2013.01)

(56) References Cited

U.S. PATENT DOCUMENTS

| | | | |
|---|---|---|---|
| 2010/0044018 A1* | 2/2010 | Furberg | C25D 5/605 205/112 |
| 2013/0122326 A1 | 5/2013 | Chen et al. | |
| 2016/0355940 A1 | 12/2016 | Chen et al. | |
| 2017/0348646 A1* | 12/2017 | Urffer | C04B 38/0006 |
| 2020/0086257 A1 | 3/2020 | Liu | |
| 2021/0268417 A1* | 9/2021 | Banju | C25D 1/20 |
| 2021/0322909 A1* | 10/2021 | Liu | C25D 3/50 |

FOREIGN PATENT DOCUMENTS

| | | | | |
|---|---|---|---|---|
| JP | 2003-164716 | * | 6/2003 | ............ B01D 39/20 |
| JP | 2003164716 A | | 6/2003 | |

OTHER PUBLICATIONS

English language machine translation for JP 8-220320. Retrieved from translationportal.epo.org on Apr. 16, 2024. (Year: 2024).*
CN Office Action for corresponding CN Application No. 202180005554.9, dated Sep. 7, 2023, pp. 1-11.
International Search Report issued in connection with corresponding PCT Application No. PCT/KR2021/013631 dated Jan. 19, 2022.

* cited by examiner

[Fig. 1]
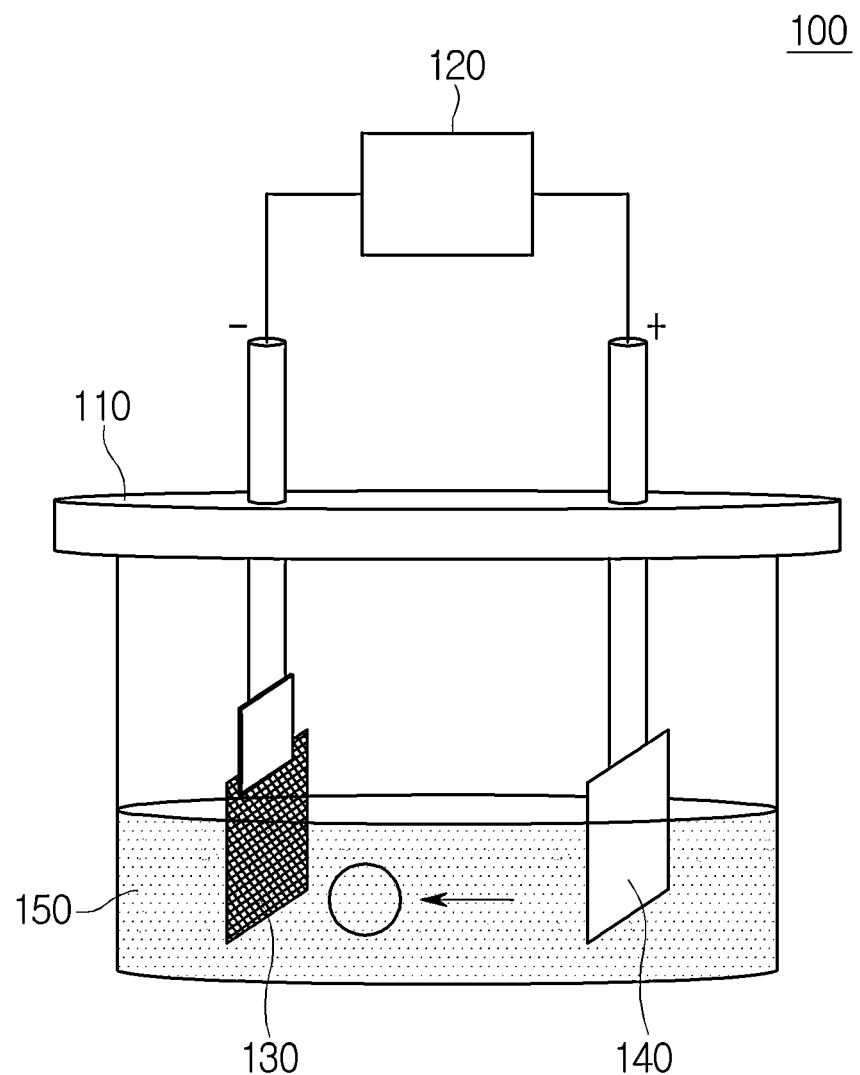

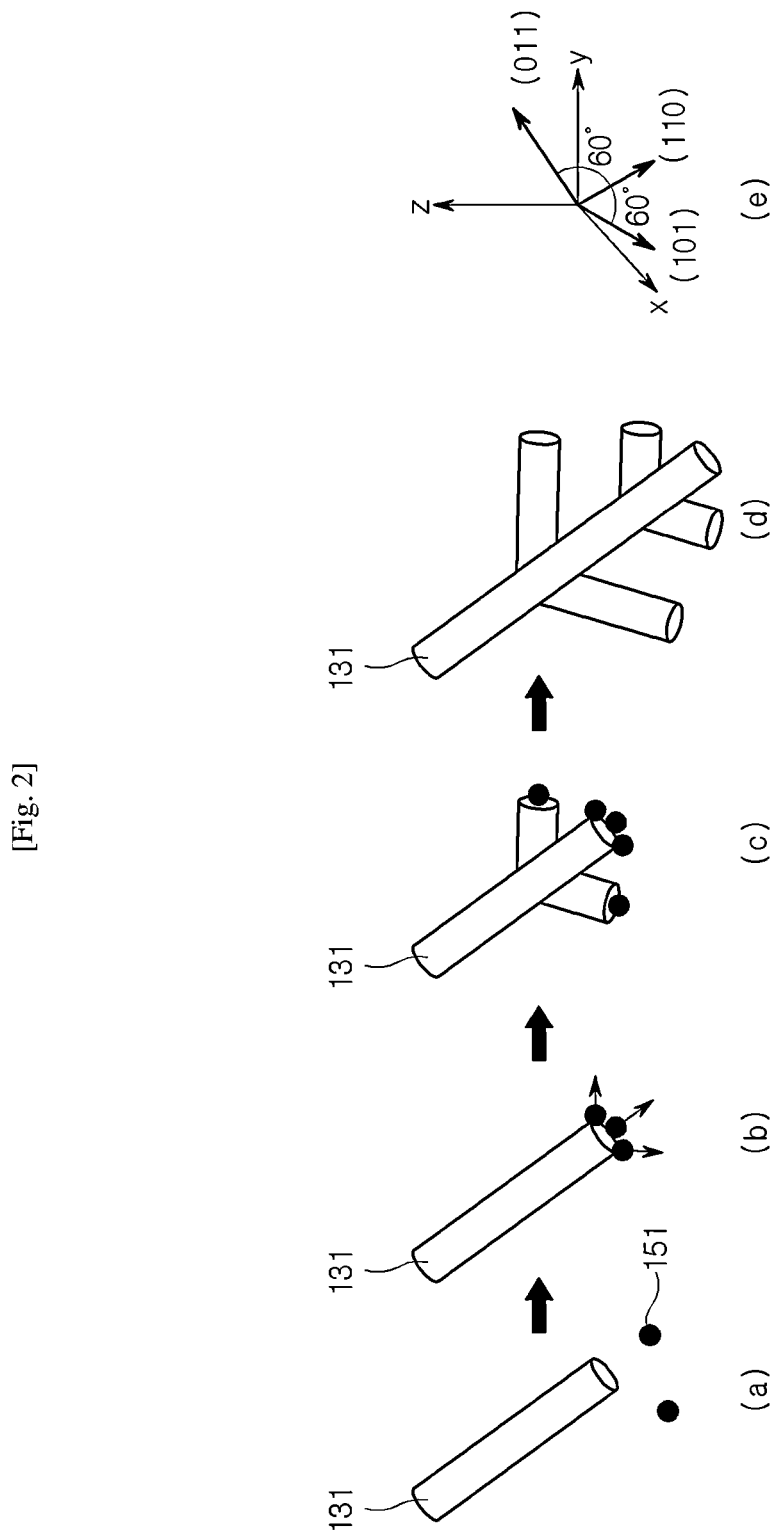
[Fig. 2]

[Fig. 3]
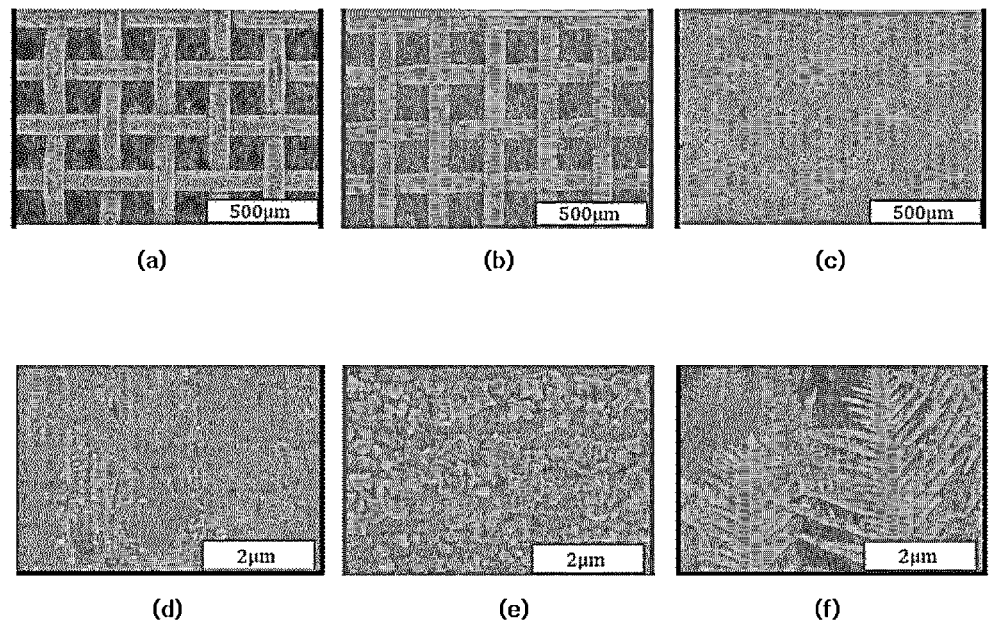
[Fig. 4]
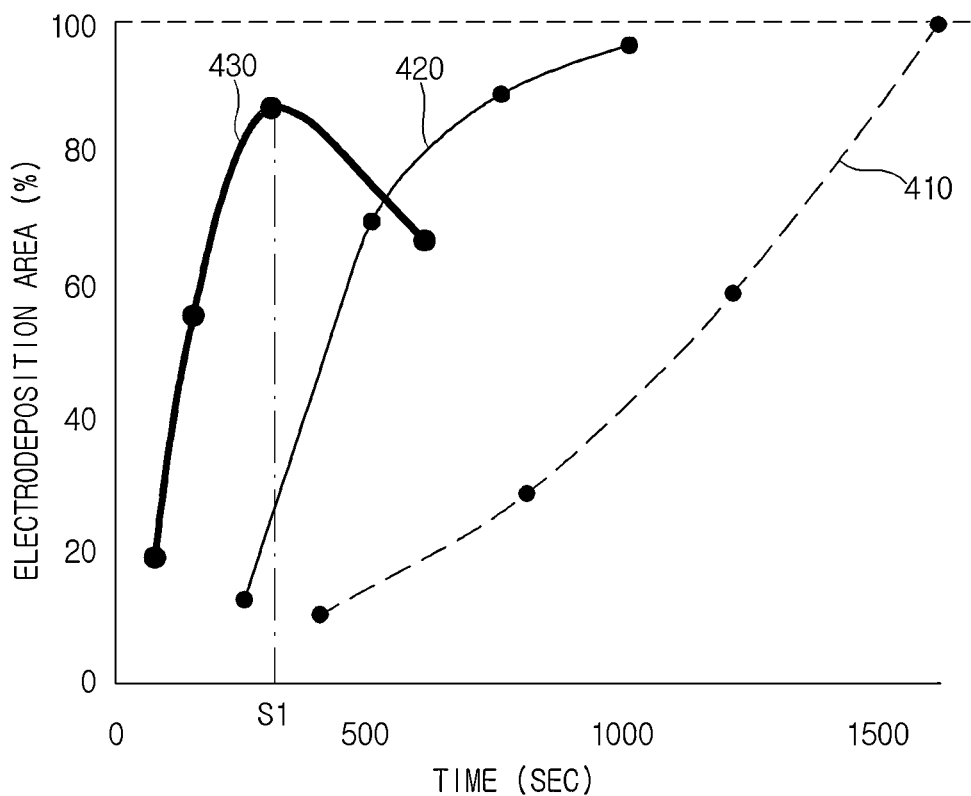

[Fig. 5]
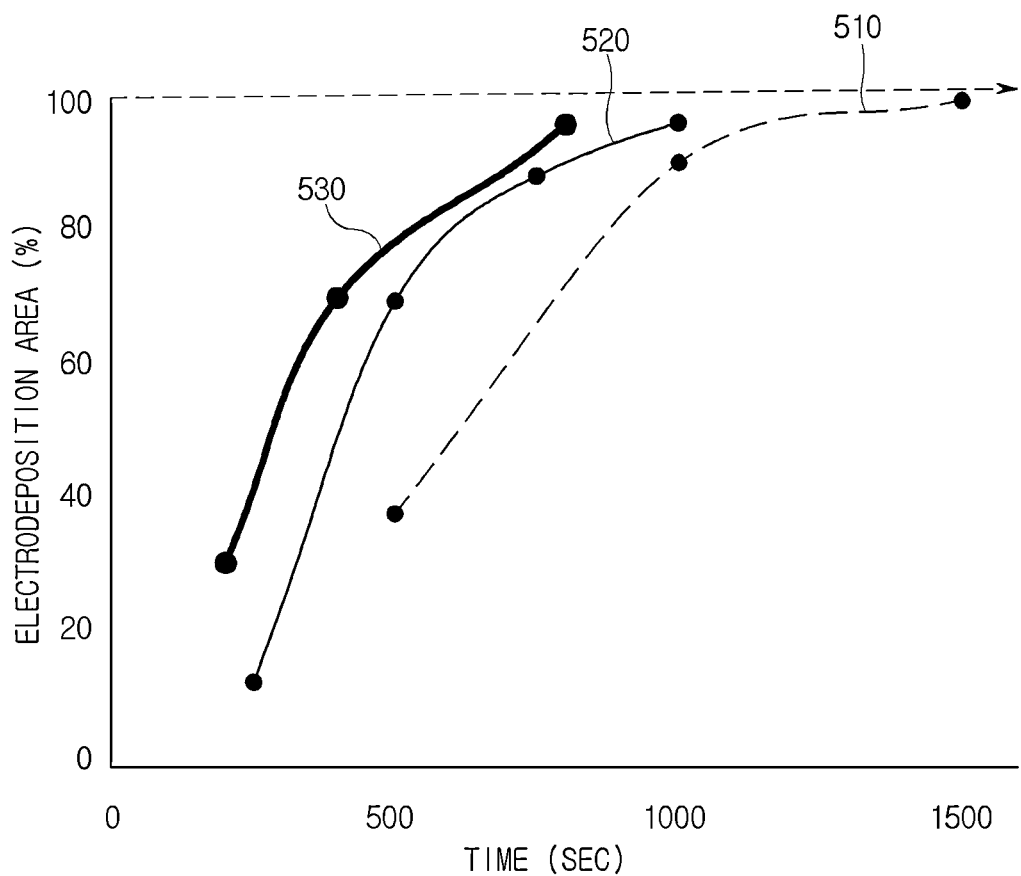

[Fig. 6]
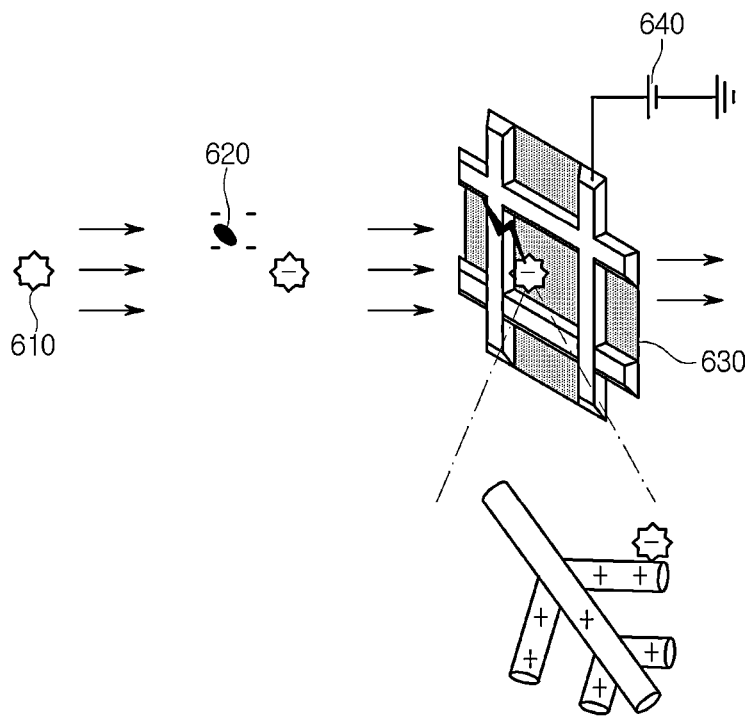
[Fig. 7]
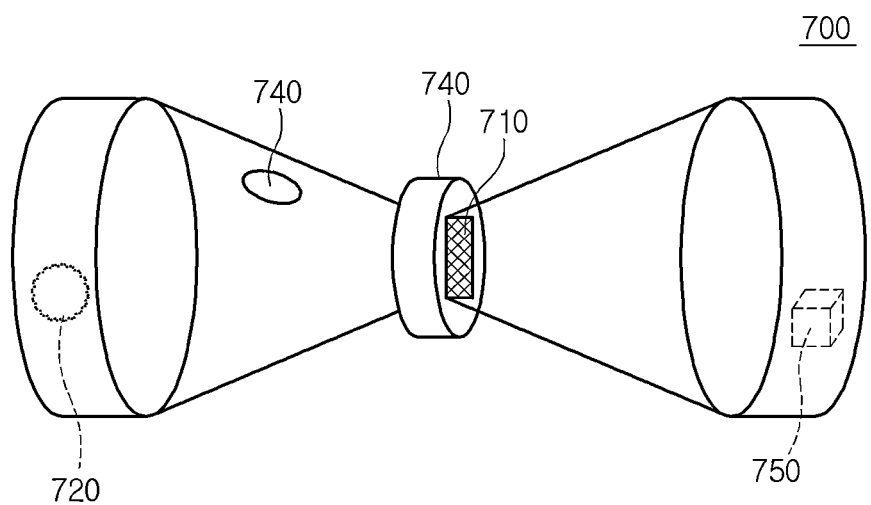

[Fig. 8]
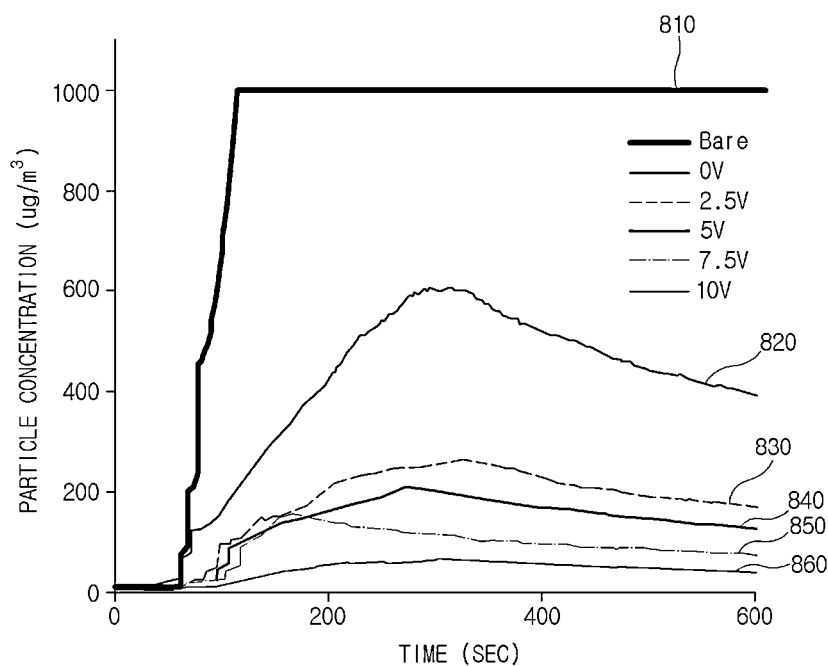
[Fig. 9]
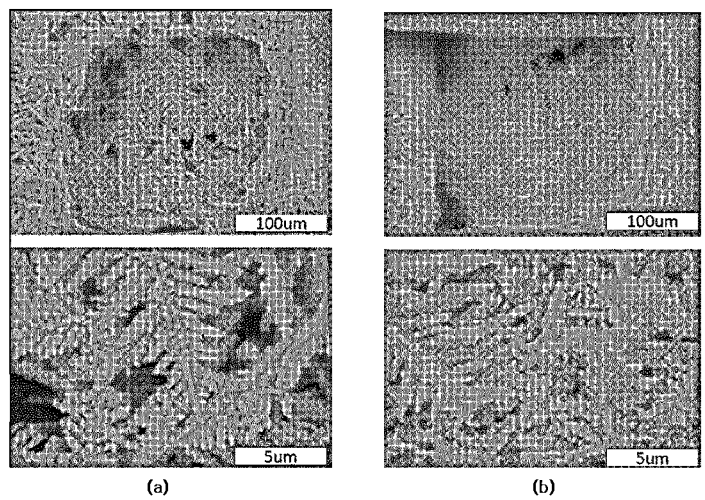
(a)    (b)
[Fig. 10]
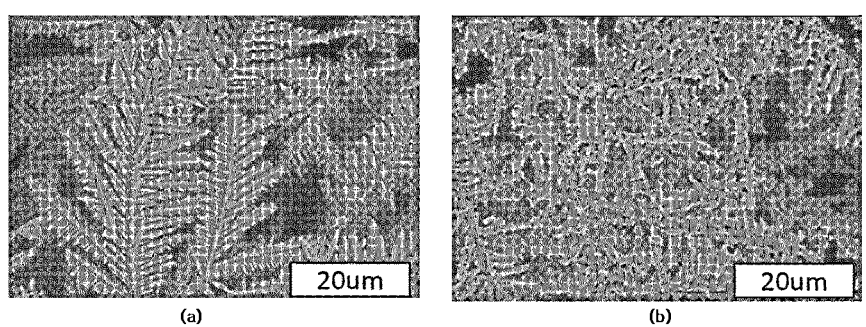
(a)    (b)

[Fig. 11]
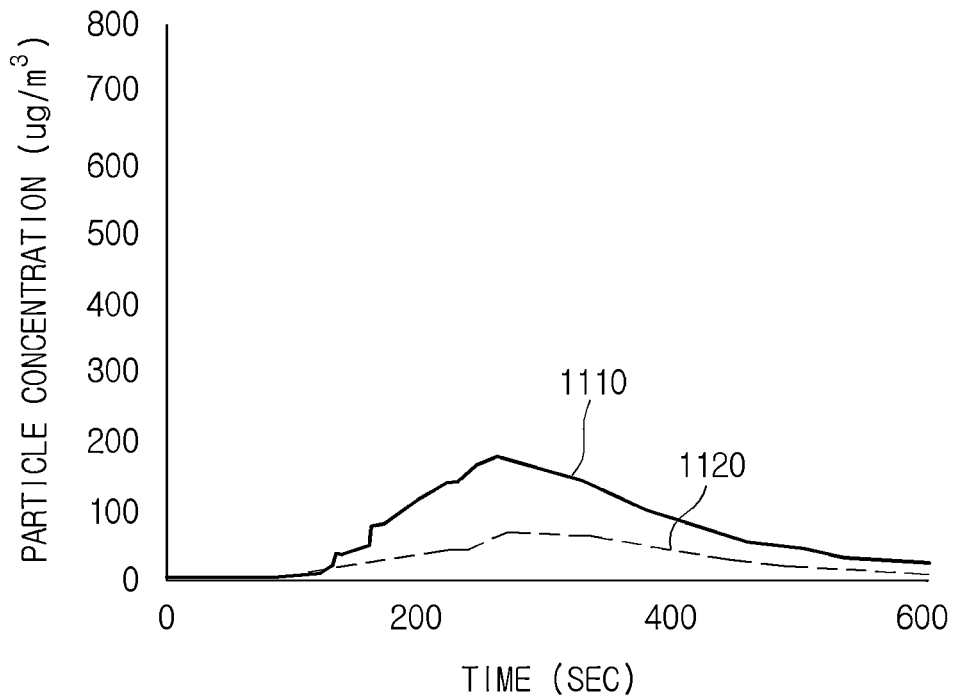
[Fig. 12]
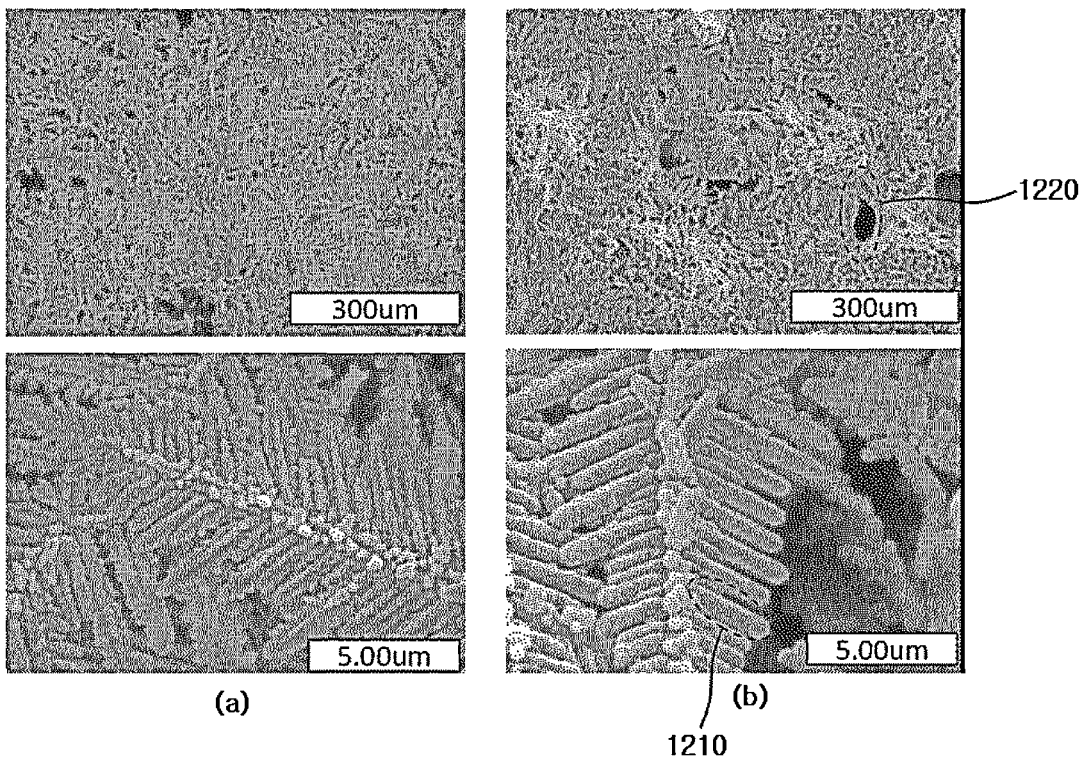

[Fig. 13]
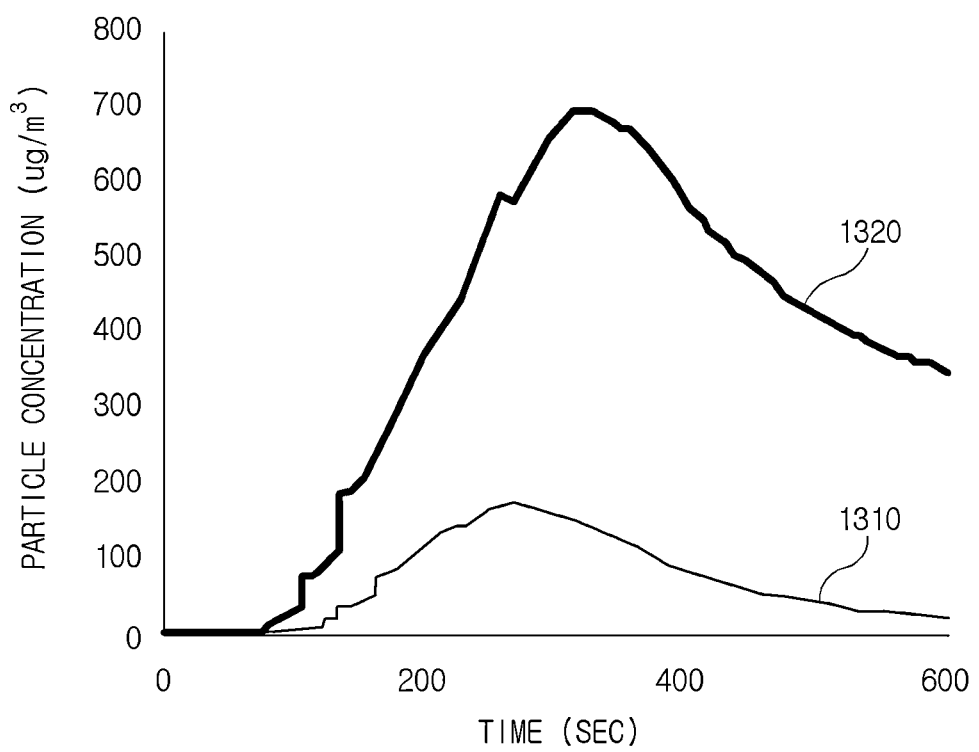

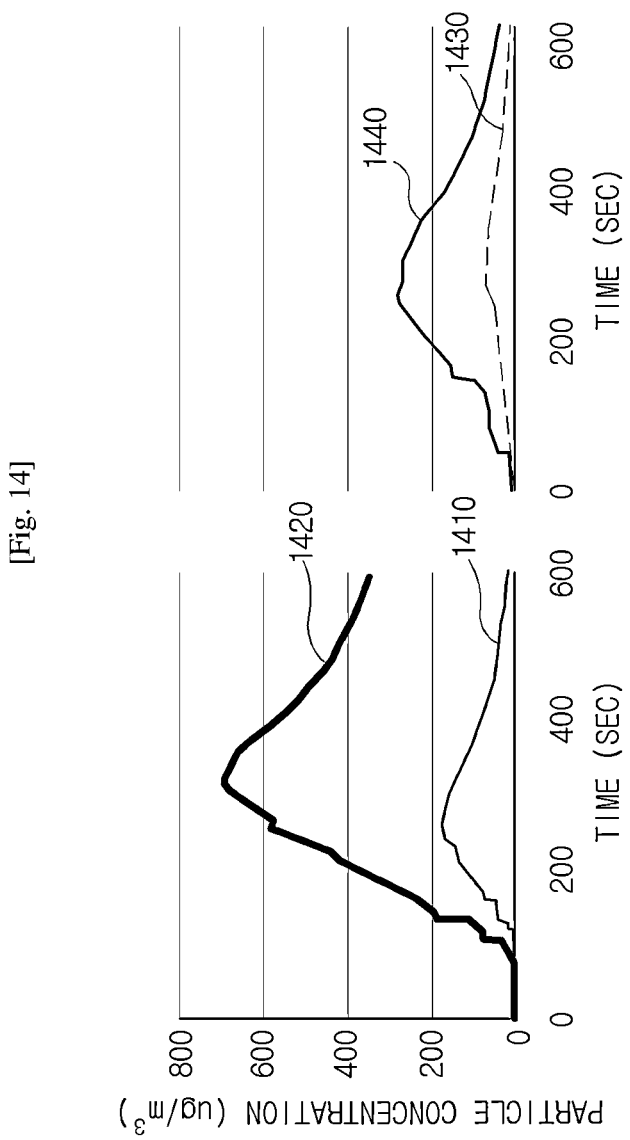
[Fig. 14]

[Fig. 15]
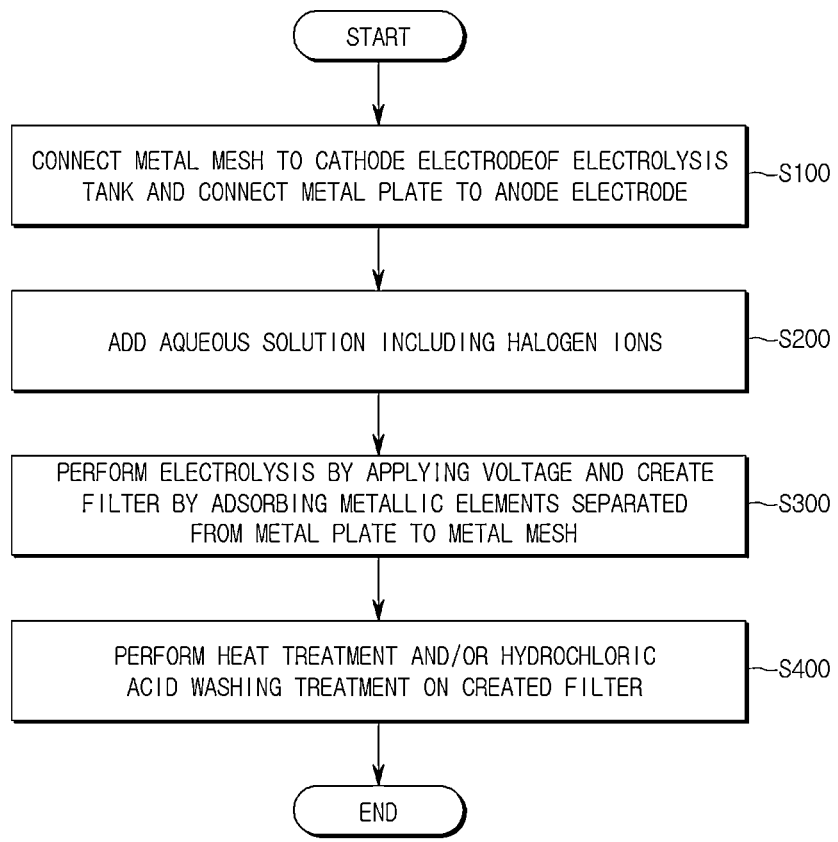
[Fig. 16]
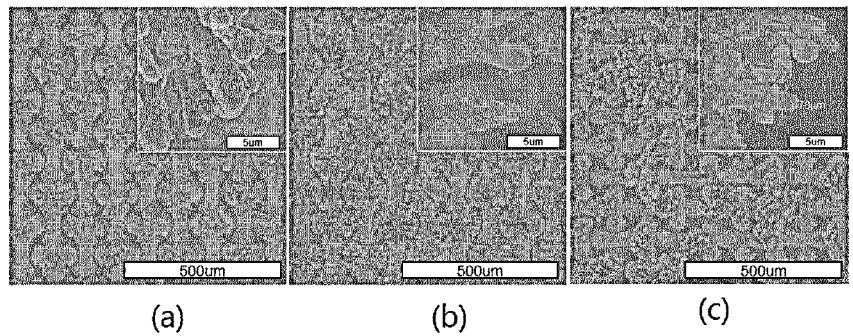
(a)      (b)      (c)
[Fig. 17]
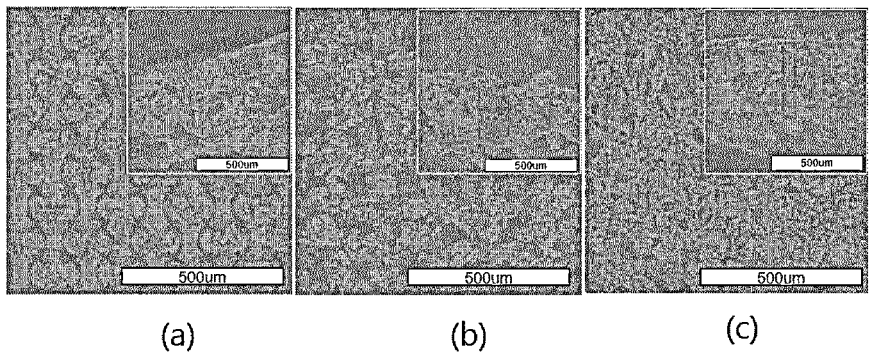
(a)      (b)      (c)

[Fig. 18]
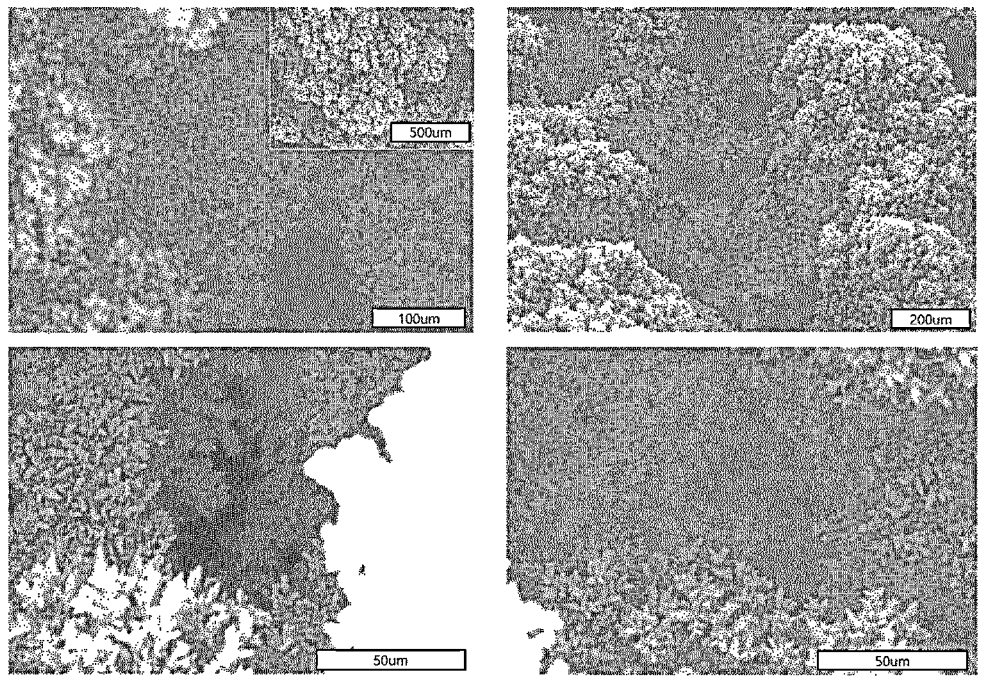
[Fig. 19]
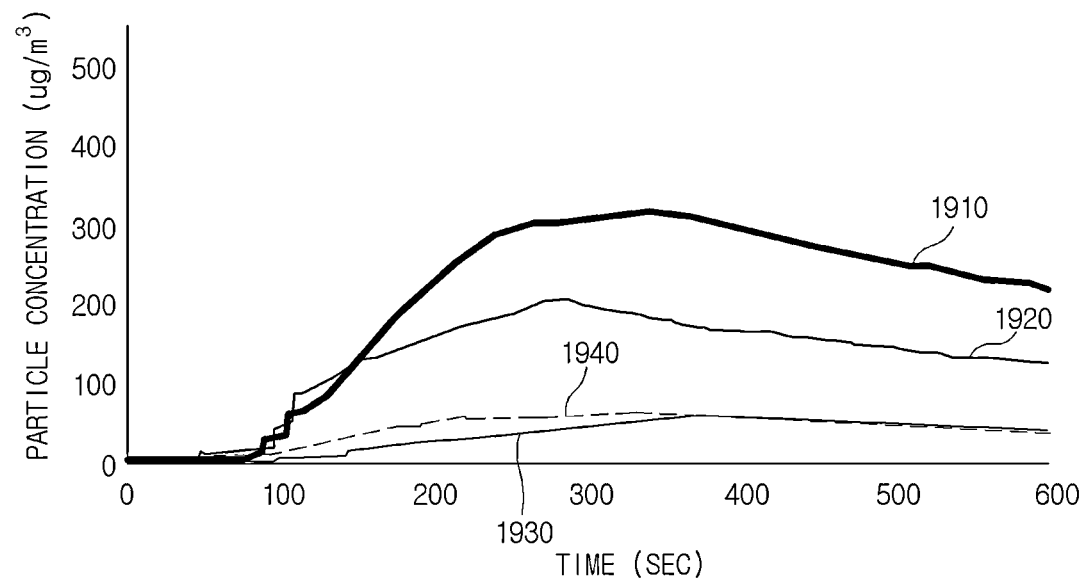

[Fig. 20]
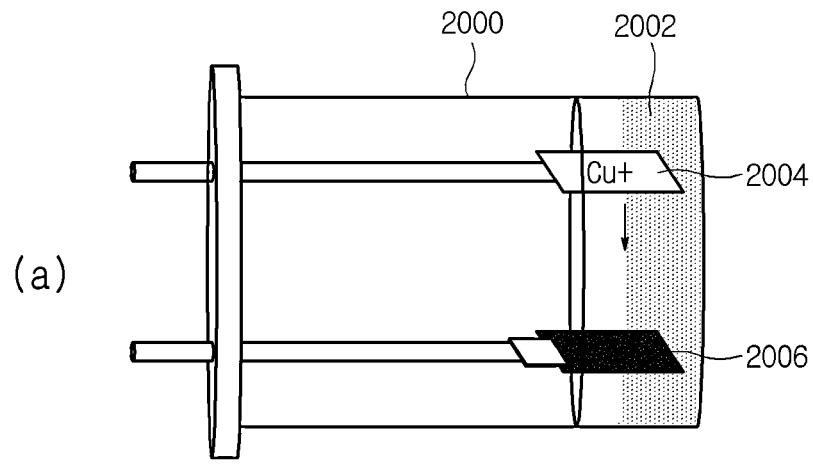
(a)
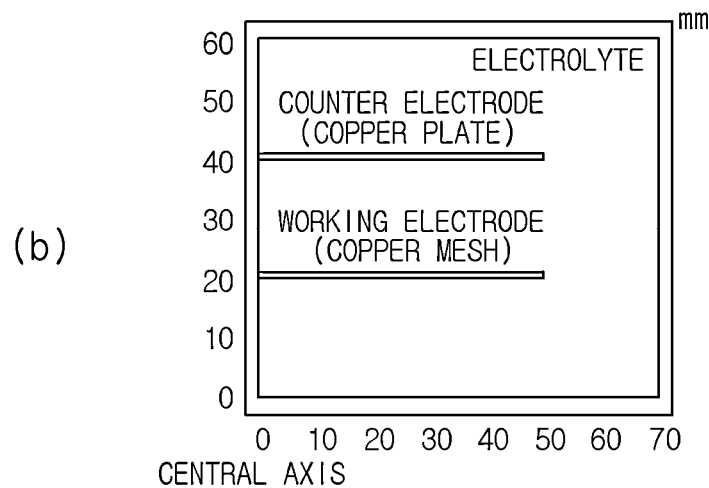
(b)
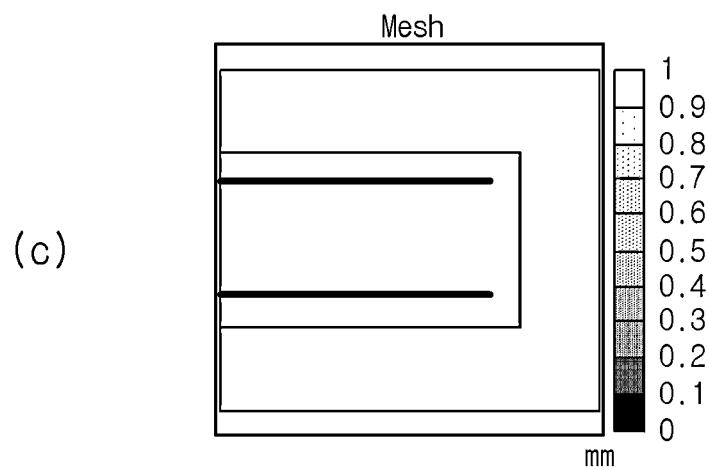
(c)

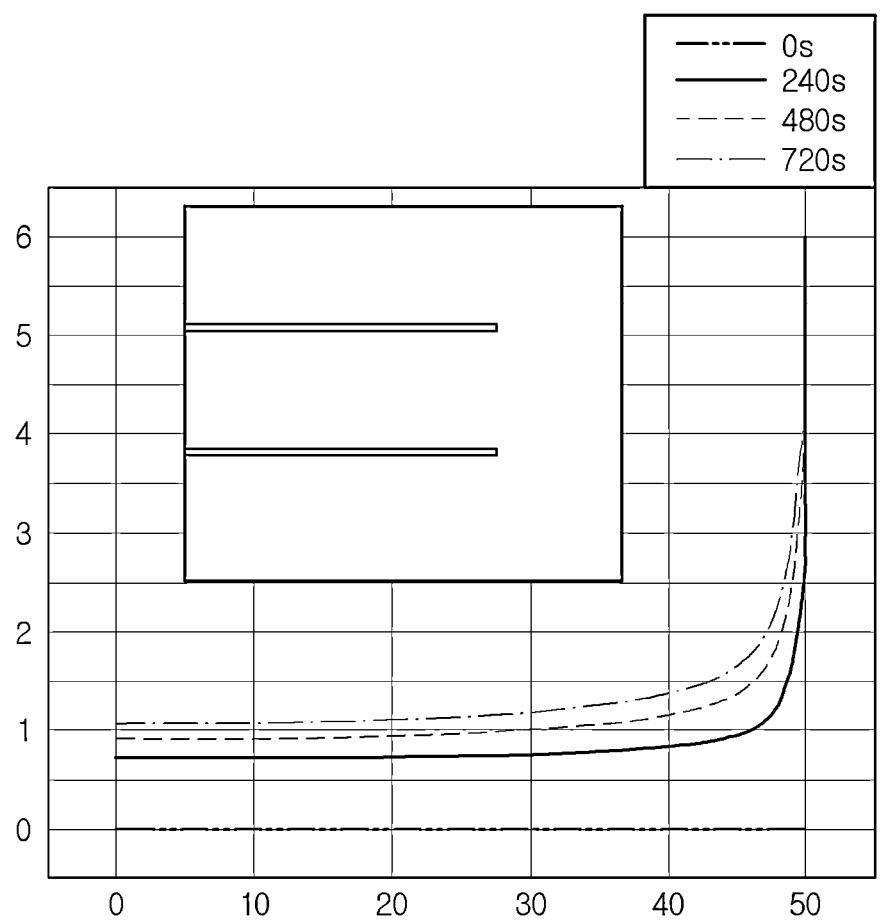
[Fig. 21A]

[Fig. 21B]
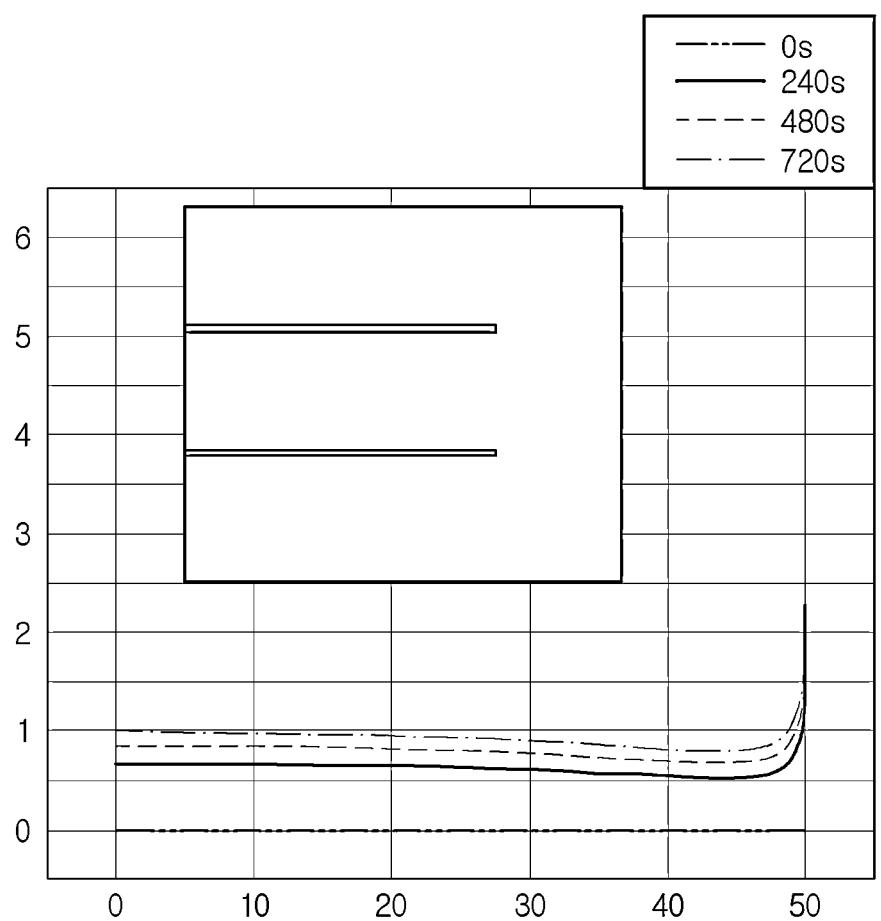

[Fig. 21C]
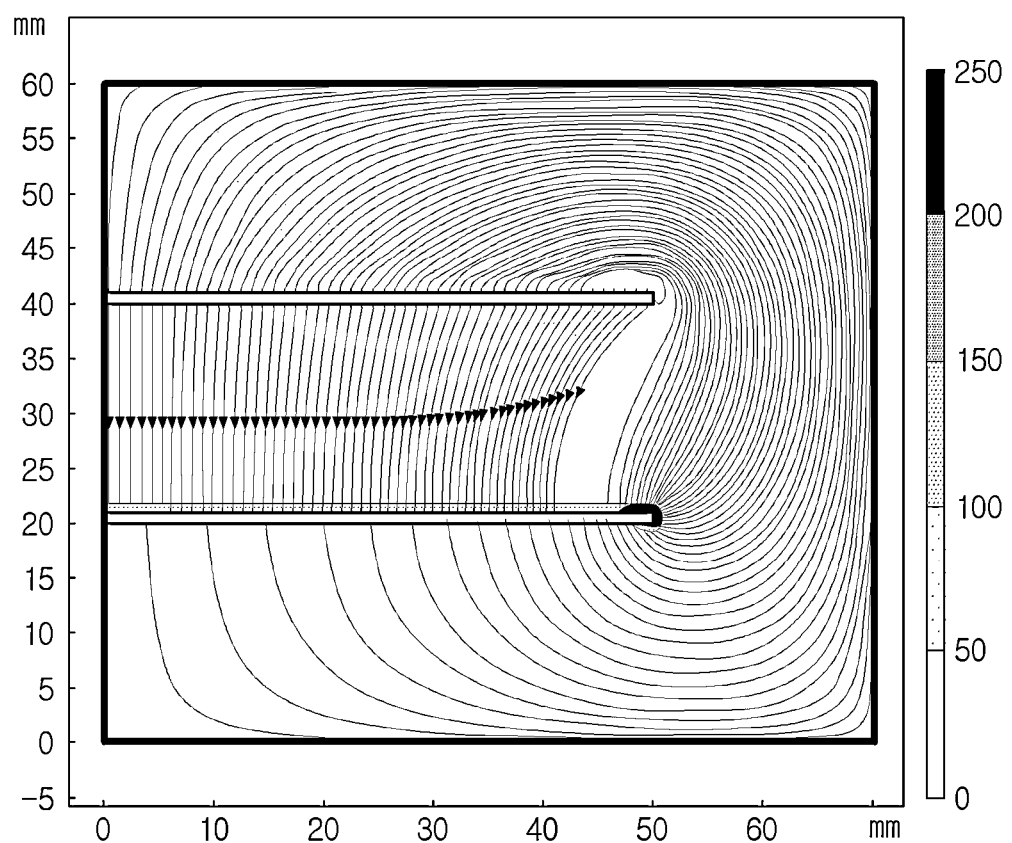

[Fig. 21D]
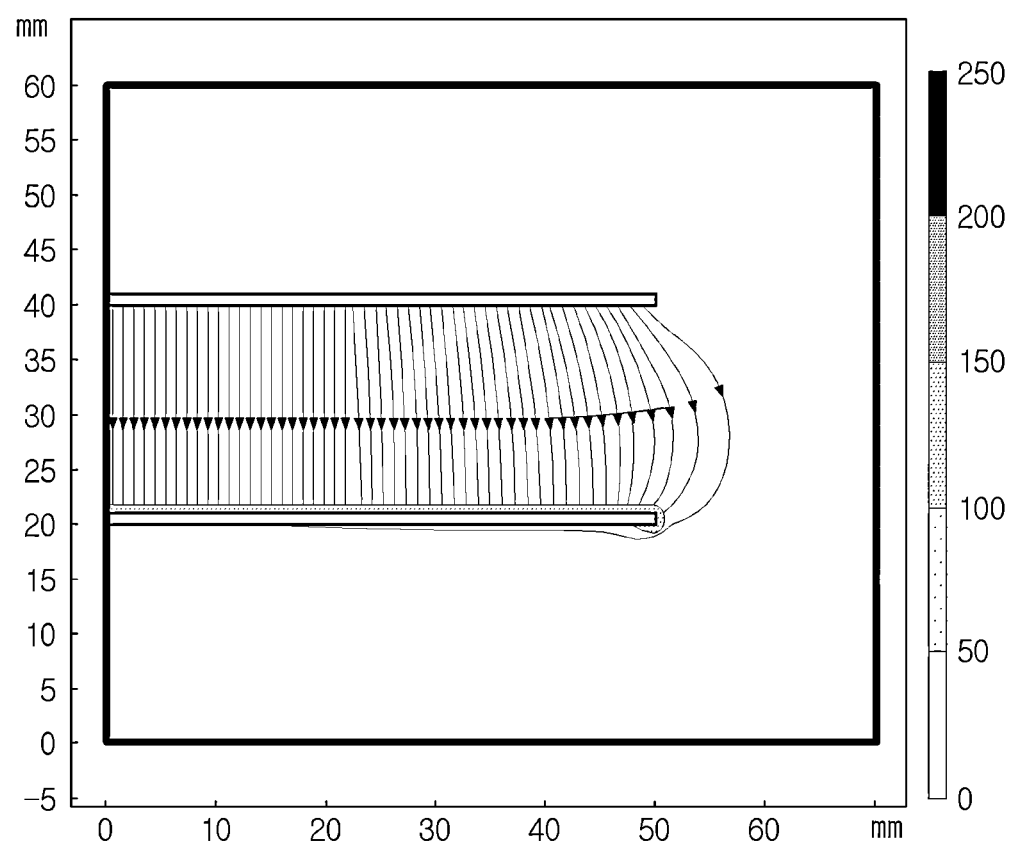

[Fig. 22A]
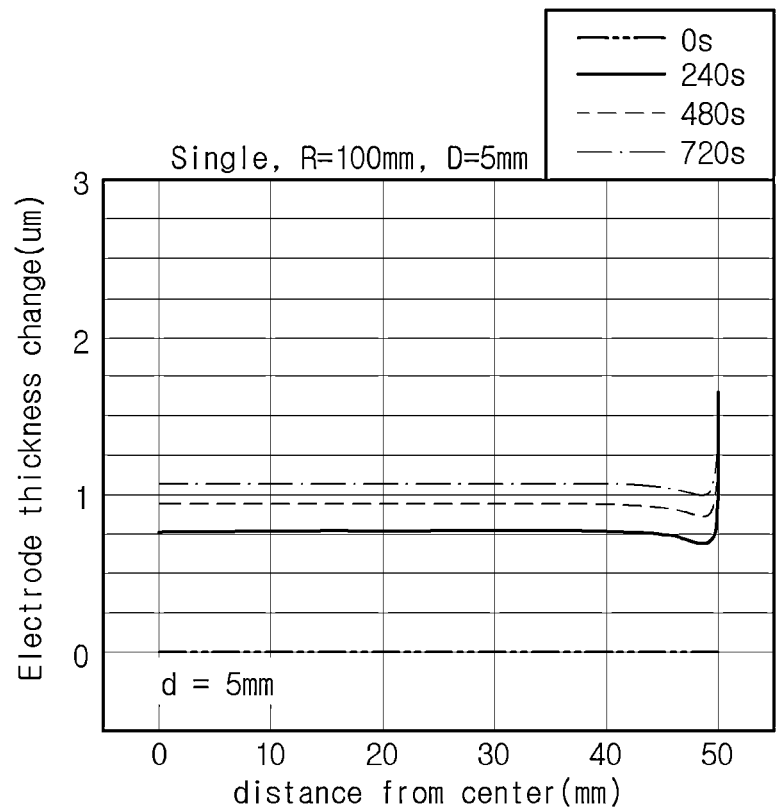
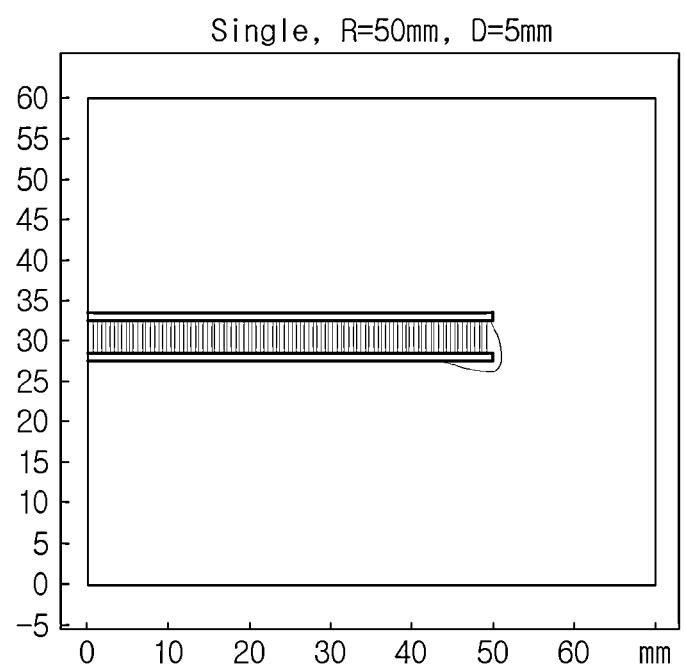

[Fig. 22B]
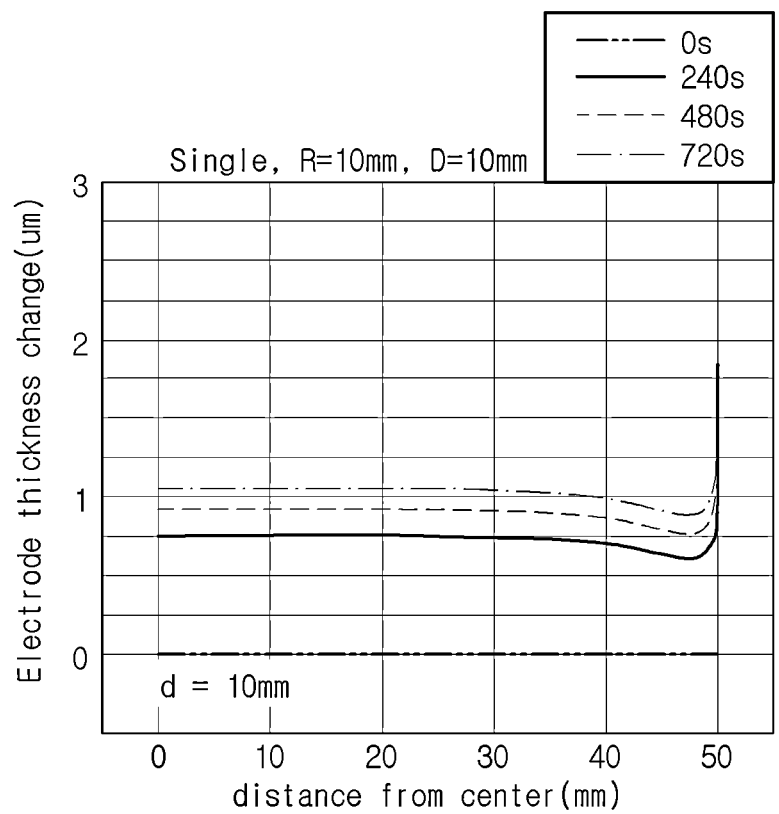
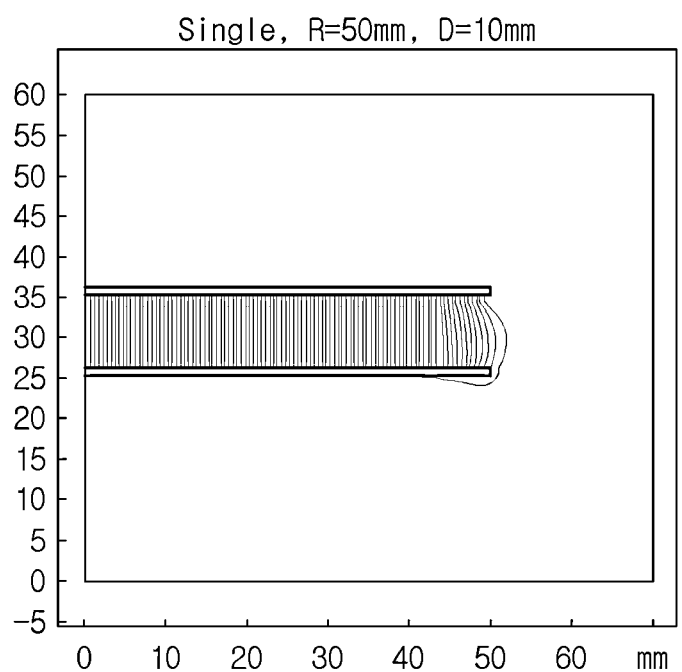

[Fig. 22C]
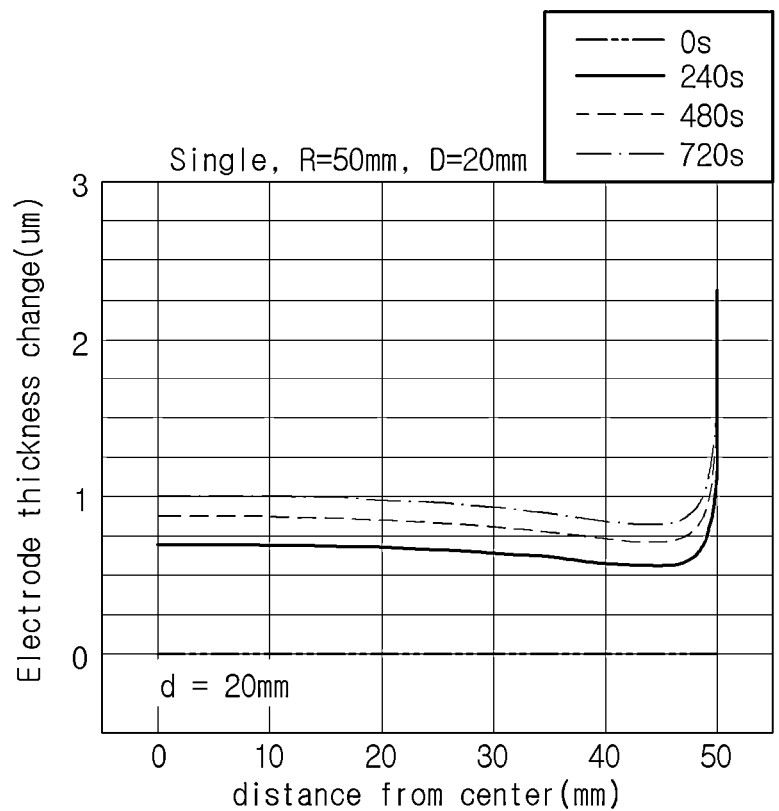
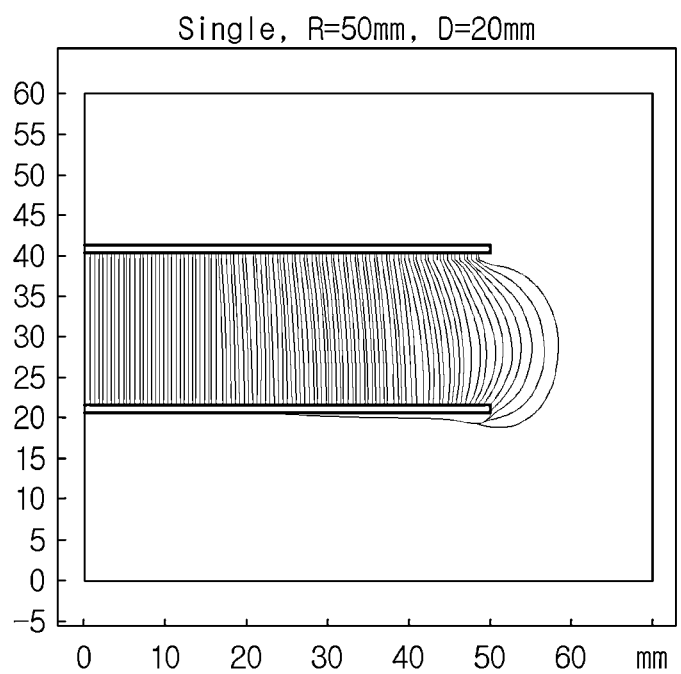

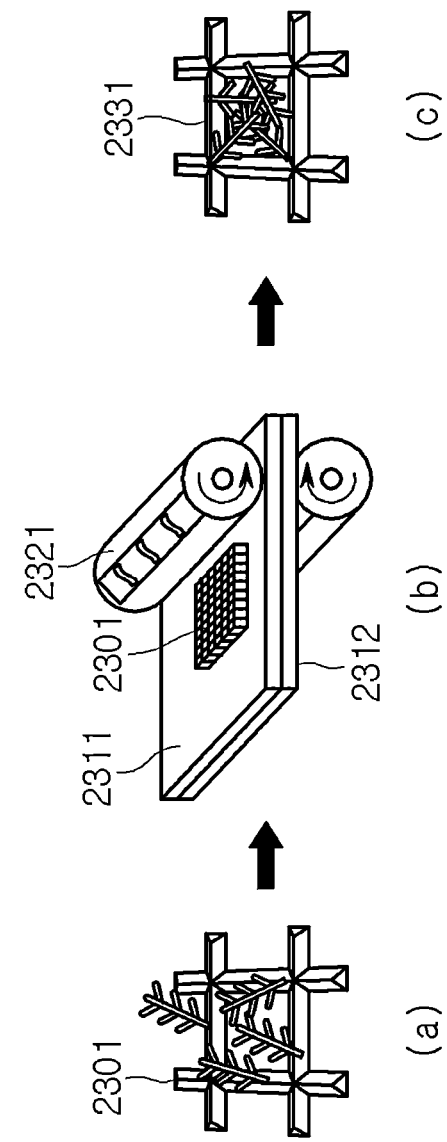
[Fig. 23]

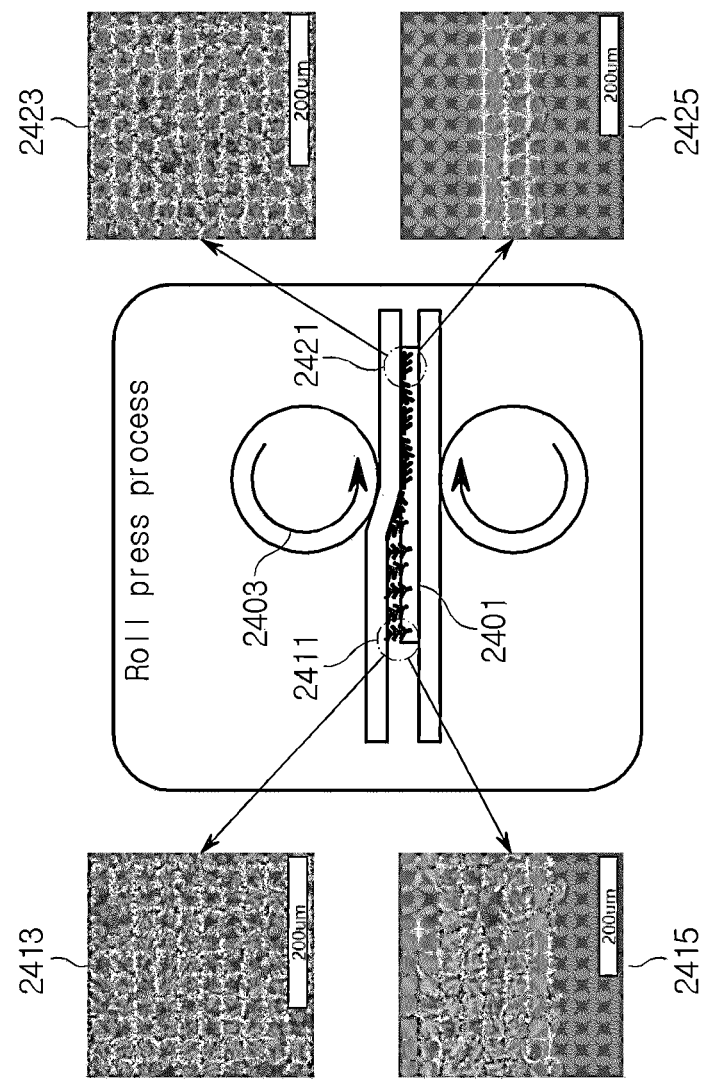

[Fig. 25]
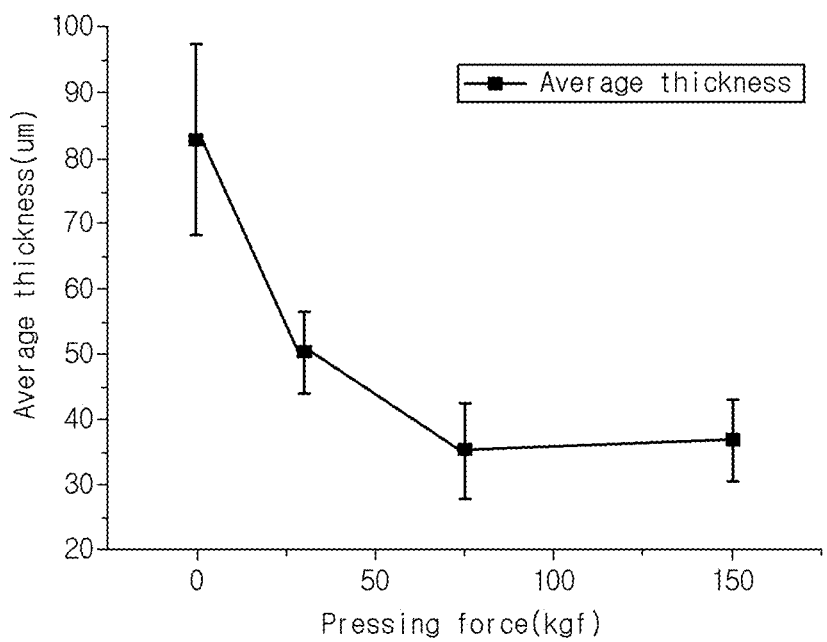
[Fig. 26]
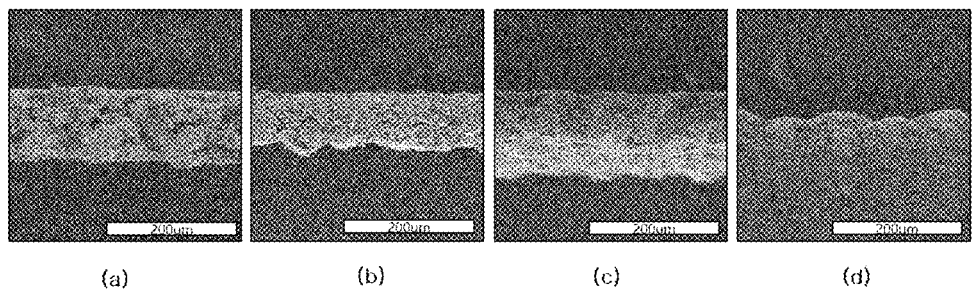
(a)      (b)      (c)      (d)
[Fig. 27]
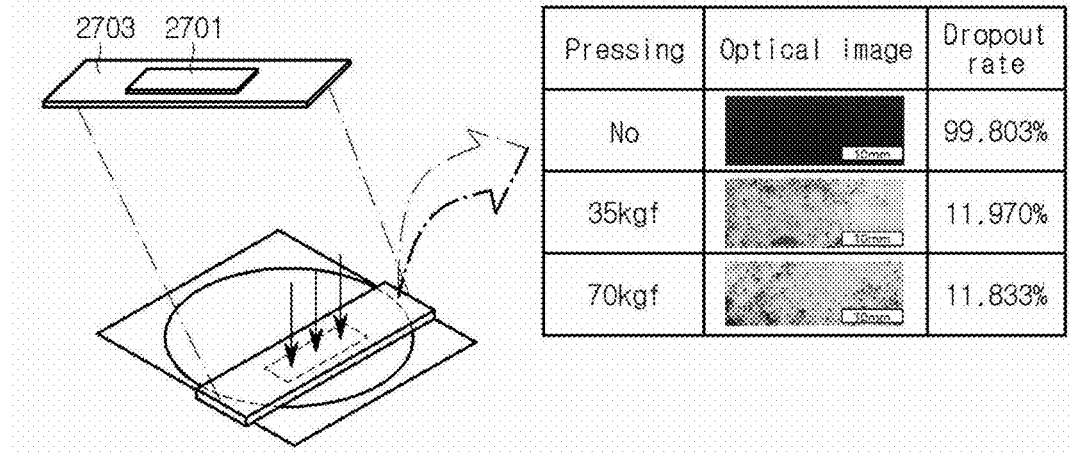

[Fig. 28]
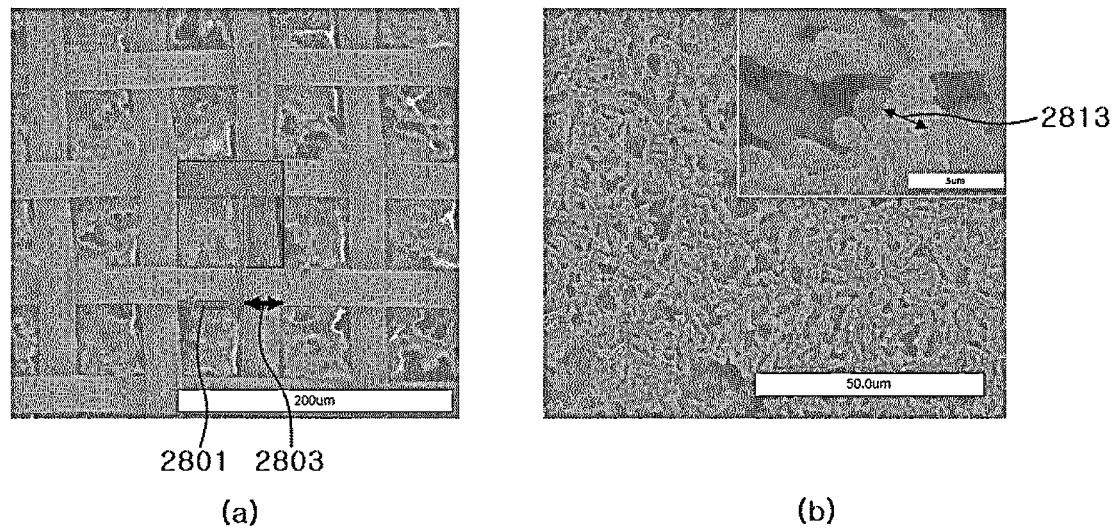
(a)          (b)
[Fig. 29]
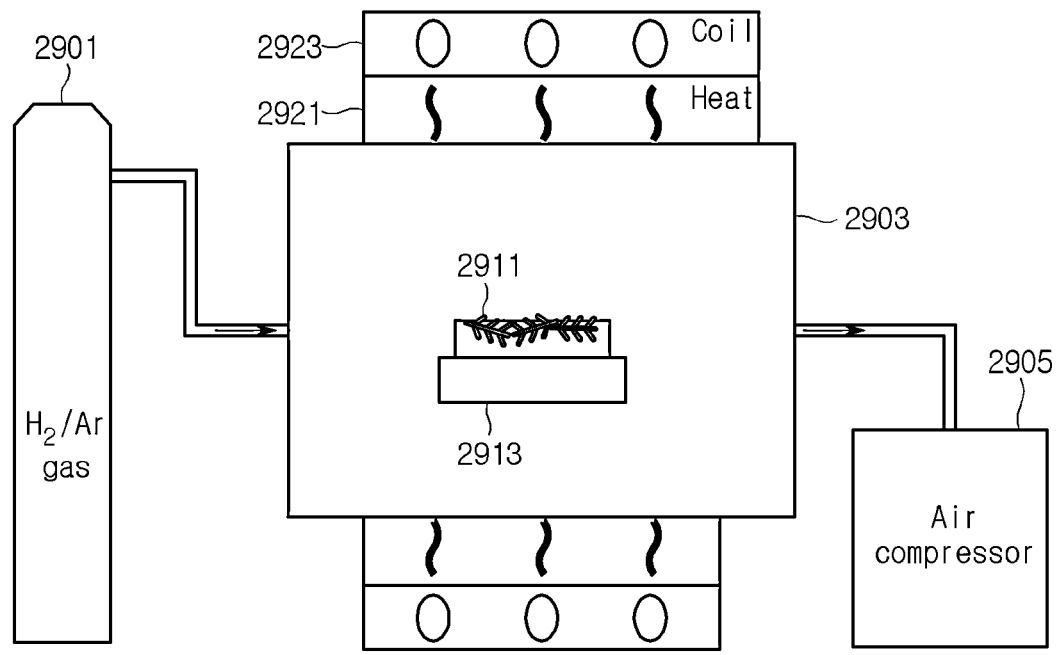

[Fig. 30]
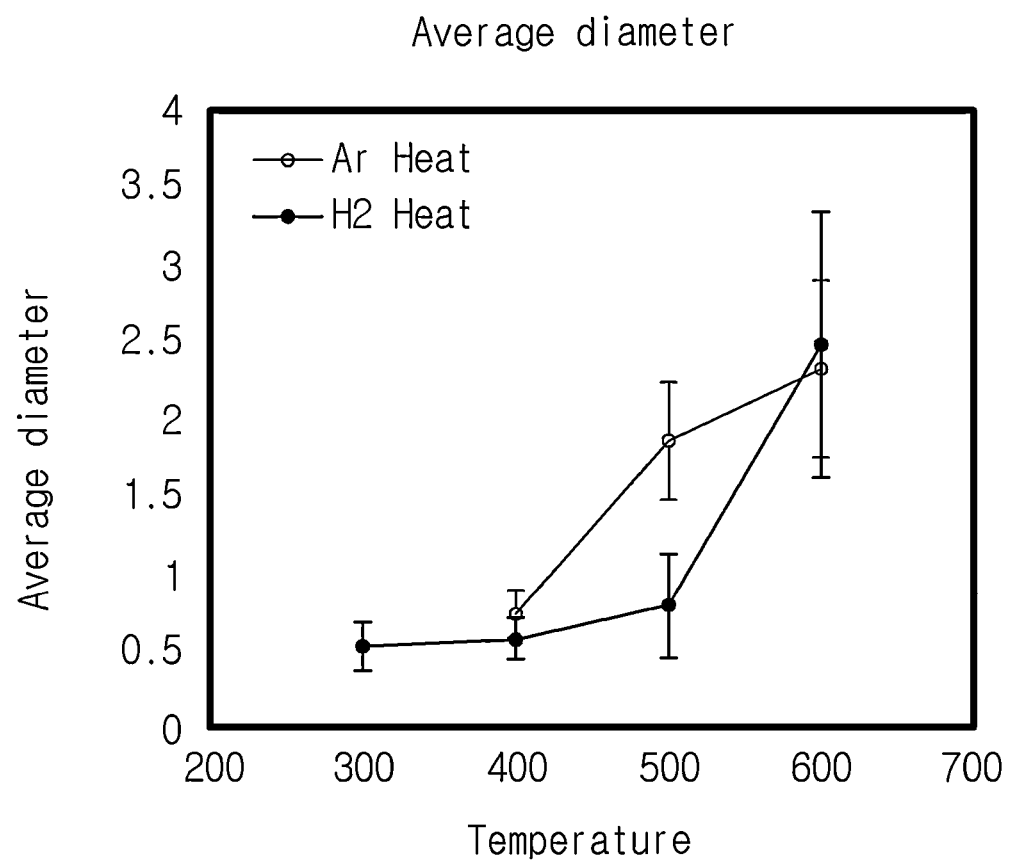
[Fig. 31]
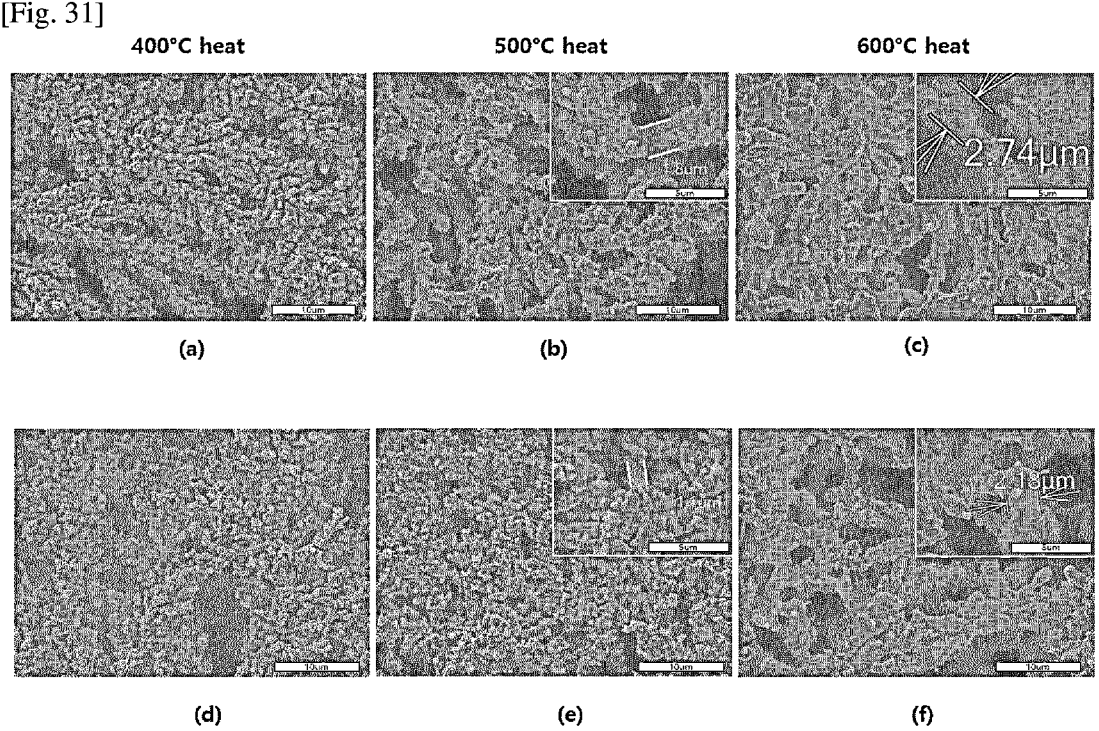

[Fig. 32]
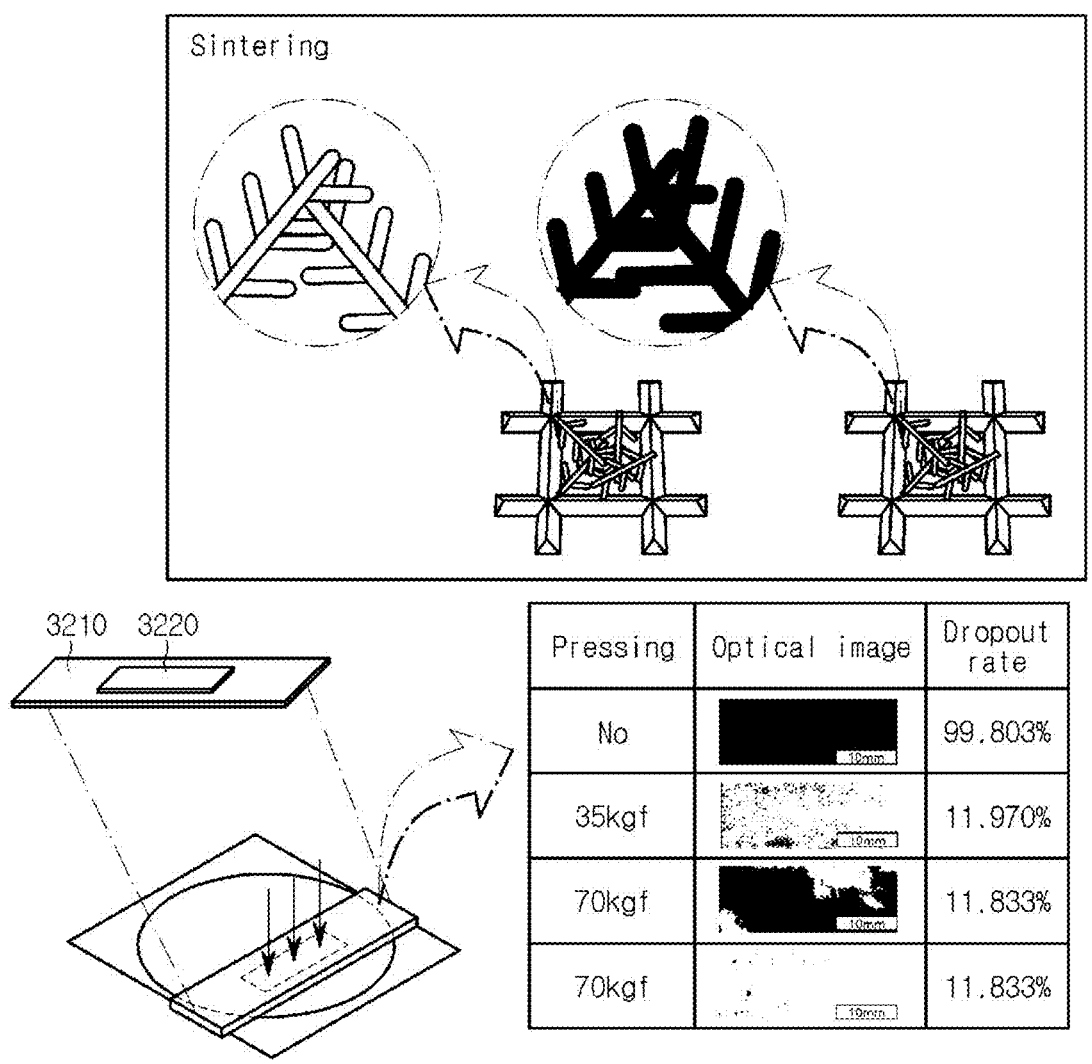

[Fig. 33]
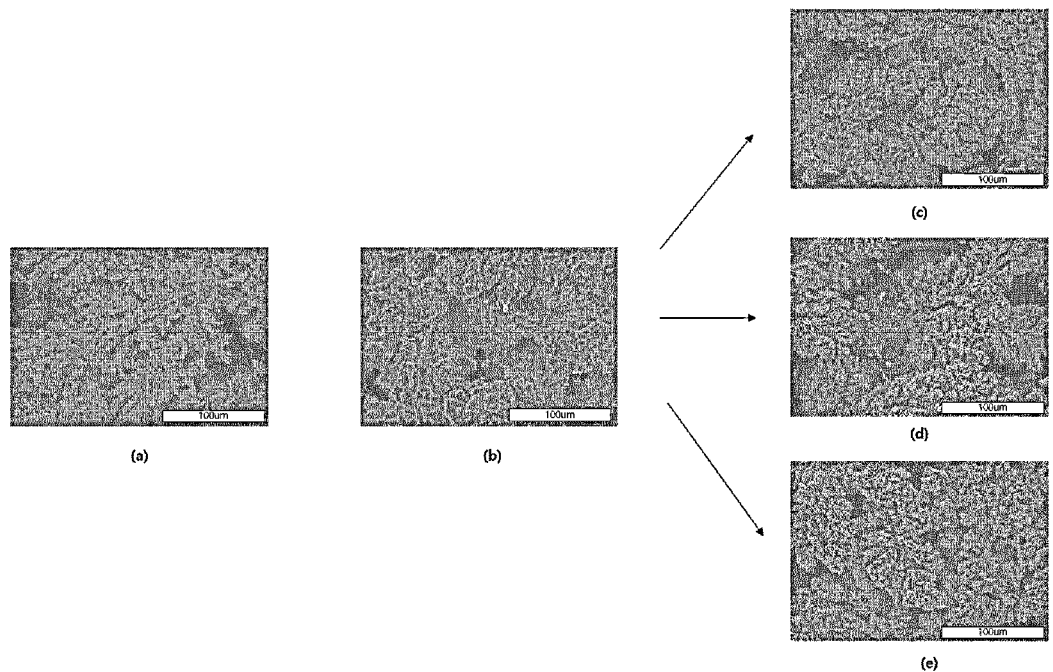
[Fig. 34]
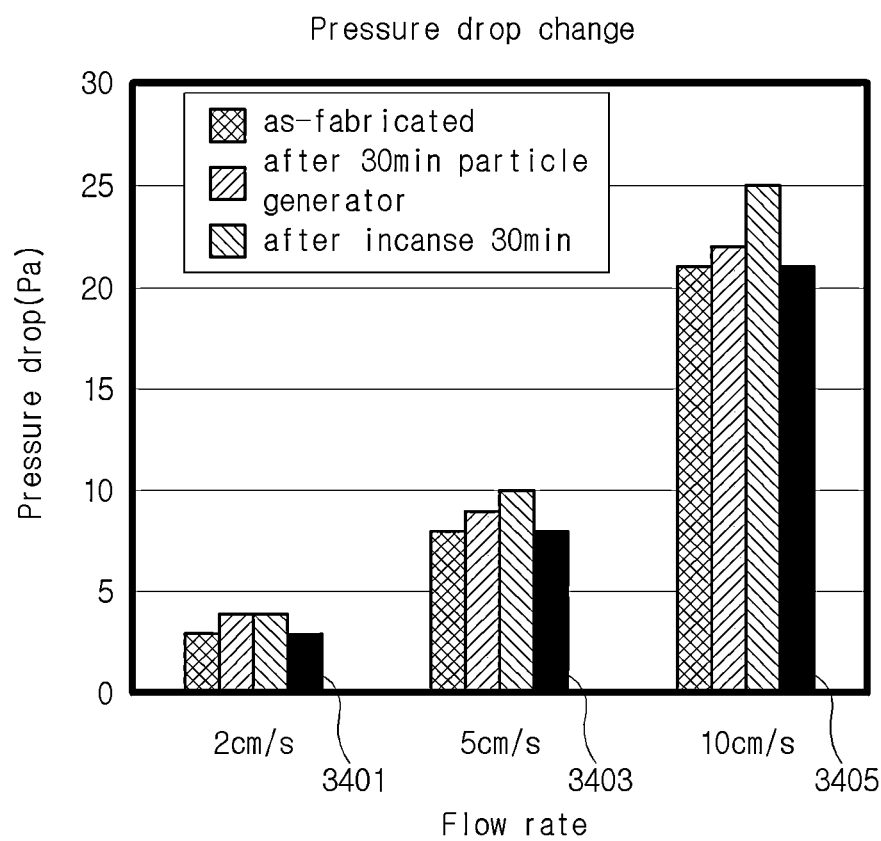

METAL AIR FILTER

RELATED APPLICATIONS

The present invention is a U.S. National Stage under 35 USC 371 patent application, claiming priority to Serial No. PCT/KR2021/013631, filed on Oct. 5, 2021; which claims priority from Korean Patent Application No. 10-2020-0131701 filed on Oct. 13, 2020 and Korean Patent Application No. 10-2021-0118602 dated Sep. 6, 2021; the entireties of which are hereby incorporated herein by reference.

TECHNICAL FIELD

Various embodiments relate to a metal air filter and a manufacturing method thereof.

BACKGROUND ART

Recently, demand for an air filter significantly increases due to the increase of awareness of fine dust.

An air filter is a filtration medium which filters fine particles suspended in the air, and the shape and required characteristics of the product may be different depending on the location and purpose of use.

An industrial air filter refers to a filter which filters fine particles in the air when air outside factories and buildings is sucked into the inside of the factories and buildings. A household air filter refers to a filter which removes fine particles in a certain indoor space and refers to a filter which removes fine particles of the air discharged when the white goods such as an air conditioner and a vacuum cleaner are used.

A filter system may be composed of four stages including a pre-filter, a functional filter, a deodorizing filter, and a high-efficiency particulate air (HEPA) filter. The pre-filter is for primarily removing large dust, and may be configured by forming a mesh with metal or the like. The pollutant of about 50% can be controlled through the pre-filter.

The functional filter is additionally configured to provide antibacterial properties to the filter system and may be configured using a non-woven fabric or the like.

A deodorizing filter removes odors, and activated carbon is used as a material of the deodorizing filter.

The HEPA filter is a high-performance filter that filters 99.97% of fine dust as small as 0.3 microns. Generally, a filter which filters 95% or more of fine dust can be regarded as the HEPA filters. The HEPA filters can be formed by using nanofibers.

Currently, a melt blown method is mainly used to manufacture the HEPA filter commercially. According to the melt blown method, a thermoplastic resin is melted and is extruded and discharged through a nozzle, and high-temperature and high-pressure air is applied to the melted polymer. Then, the polymers are stacked on a conveyor belt in an extremely fine state and are combined by self-adhesiveness by residual heat, and then, are manufactured in the structure of nanofibers. The diameter of the nanofiber structure produced by the melt blown method is about 0.8 μm to 1 μm, and captures particles such as fine dust by the van der Waals force.

Also, recent research has announced that a thermoplastic resin is melted by using electrospinning instead of the melt blown method. When the thermoplastic resin is melted by using electrospinning, the diameter of the nanofiber structure can be reduced to about 0.3 μm compared to the conventional melt blown method, and it is possible to obtain high efficiency with a limited pressure loss by means of an air filter for a clean room for semiconductors or operating rooms. However, this method has a production cost and a limitation in the process of manufacturing a large-area air filter.

(Non-Patent Document 1)
1. Kadam, Vinod & Wang, Lijing & Padhye, Rajiv., "Electrospun nanofibre materials to filter air pollutants—A review." Journal of Industrial Textiles, 2016, 47. 10.1177/1528083716676812.

DISCLOSURE OF INVENTION

Technical Problem

The purpose of various embodiments of the present disclosure is to provide a manufacturing method of a HEPA filter, which has a lower cost than that of a conventional method and is capable of performing a large-area process.

The purpose of various embodiments of the present disclosure is to provide a manufacturing method of a low cost and large-area HEPA filter, which uses metal as a material and uses electrodeposition.

The purpose of various embodiments of the present disclosure is to provide a heat treatment and/or chemical treatment method which uses electrodeposition to manufacture a filter with a micro mesh structure having nano branches and improves the performance of the manufactured filter.

The technical problem to be overcome in the present disclosure is not limited to the above-mentioned technical problems. Other technical problems not mentioned can be clearly understood from those described below by a person having ordinary skill in the art.

Solution to Problem

One embodiment is a metal air filter including: a filter which is formed of a metallic material by electrodeposition and has a nano branch structure; an ionizer which conducts particles to be captured by the filter with negative charges; and a power supply which supplies a positive voltage for conducting the filter with positive charges and a negative voltage for the ionizer.

The filter is formed by electrodeposition according to electrolysis in an electrolytic tank which includes a metal mesh attached to a cathode electrode, a metal plate attached to an anode electrode, and an aqueous solution. The filter has a nano branch structure.

The filter is formed by additionally performing a hydrochloric acid washing process.

The aqueous solution includes a halogen element, and a voltage which is applied between the cathode electrode and the anode electrode is 0.7 V.

The aqueous solution includes copper sulfate and sulfuric acid, and a voltage which is applied between the cathode electrode and the anode electrode is 2.4 V.

Only one of both sides of the metal plate within the electrolytic tank is opened such that only the one of both sides of the metal plate is involved in an electrochemical reaction for the electrodeposition. A distance between the metal mesh and the metal plate within the electrolytic tank is set to 5 mm.

The filter is obtained by additionally performing a mechanical compression process on the filter formed by the electrodeposition.

The filter is formed by additionally performing a heat treatment using hydrogen gas on the filter formed by the electrodeposition.

The heat treatment using hydrogen gas is performed by disposing, in a vacuum tube, a graphite plate on which the filter formed by the electrodeposition is disposed, by injecting a mixed gas including hydrogen gas into the vacuum tube, and by applying heat to the vacuum tube.

Another embodiment is a manufacturing method of the metal filter. The manufacturing method includes: connecting a metal mesh in which metal wires are intertwined to a cathode electrode of an electrolytic tank; connecting a metal plate to an anode electrode of the electrolytic tank; adding an aqueous solution such that the metal mesh and the metal plate of the electrolytic tank are submerged; and forming the filter by performing electrolysis by applying a voltage between the cathode electrode and the anode electrode of the electrolytic tank.

The aqueous solution includes a halogen element, and a voltage which is applied between the cathode electrode and the anode electrode is 0.7 V.

The aqueous solution includes copper sulfate and sulfuric acid, and a voltage which is applied between the cathode electrode and the anode electrode is 2.4 V.

The forming the filter further includes connecting nano branches of the filter obtained by the electrolysis to each other and performing a heat treatment using hydrogen gas in order to reduce diameters of the nano branches.

The forming the filter further includes performing a hydrochloric acid washing process for removing halogen elements included in the filter obtained by the electrolysis.

The forming the filter further includes performing a mechanical compression process on the filter obtained by the electrolysis.

Only one of both sides of the metal plate within the electrolytic tank is opened, and a distance between the metal mesh and the metal plate within the electrolytic tank is set to 5 mm.

Further another embodiment is a filter which is used to filter particles included in the air, and the filter is formed of a metallic material by electrodeposition and has a nano branch structure.

The nano branch structure is formed by induction of halogen elements included in an aqueous solution provided by an electrolytic tank for the electrodeposition.

The nano branches of the filter are connected to each other by a hydrogen-based heat treatment.

Halogen elements used to form the filter is removed by a hydrochloric acid washing process.

The filter is formed by the electrodeposition and then is mechanically compressed.

Advantageous Effects of Invention

The method proposed by the present disclosure is able to manufacture a filter more simply at a lower cost than a conventional process.

The filter manufacturing method based on the electrodeposition proposed by the present disclosure is able to manufacture metal wires having various sizes and a large-area filter.

The filter manufactured according to the method proposed by the present disclosure captures particles by using Coulombic force much greater than the conventional van der Waals force, thereby improving the efficiency of the filter even at a low energy consumption.

The method proposed by the present disclosure is able to improve mechanical characteristics and provide stability through an additional heat treatment and HCl removal.

Advantageous effects that can be obtained from the present disclosure are not limited to the above-mentioned effects. Further, other unmentioned effects can be clearly understood from the following descriptions by those skilled in the art to which the present disclosure belongs.

BRIEF DESCRIPTION OF DRAWINGS

FIG. 1 shows a concept in which a filter is formed by electrodeposition according to various embodiments of the present disclosure;

FIG. 2 shows an example in which the metal nano branches are formed in the metal mesh 130;

FIG. 3 shows filters formed under various conditions;

FIG. 4 shows the size of an electrodeposition area according to a voltage applied during the electrolysis;

FIG. 5 shows the size of the electrodeposition area according to a diameter of the metal wire and a distance between the metal wires used to form the metal mesh 130 formed by intertwining the metal wires;

FIG. 6 shows a filtering mechanism according to various embodiments;

FIG. 7 shows a test apparatus for testing the performance of the filter manufactured by using the electrodeposition proposed in the present disclosure FIG. 8 shows the concentrations of the particles measured by the particle counter after filtering according to various voltages applied to the filter;

FIG. 9 shows a shape of the filter after filtering;

FIG. 10 shows the nano branch structure of the filter before and after the heat treatment;

FIG. 11 shows the performance of the filter before and after the heat treatment;

FIG. 12 shows the structure of the filter before and after washing with hydrochloric acid;

FIG. 13 shows the performance of the filter before and after washing with hydrochloric acid;

FIG. 14 shows the performance of the filter to which both the heat treatment and hydrochloric acid washing are applied;

FIG. 15 is a flowchart showing a process of manufacturing the filter by using the electrodeposition according to various embodiments;

FIG. 16 shows filters formed by different applied voltages;

FIG. 17 shows filters formed during different electrodeposition time intervals;

FIG. 18 shows a structure of a filter formed by performing electrodeposition using an aqueous solution including no halogen element;

FIG. 19 shows the performance of the filter manufactured without halogen elements in the aqueous solution;

FIG. 20 shows a simulation environment;

FIGS. 21A, 21B, 21C, and 21D show simulation graphs when the counter electrode is involved in an electrochemical reaction;

FIGS. 22A, 22B, and 22C show simulation graphs according to a distance between the electrodes when a single side of the counter electrode is involved in the electrochemical reaction:

FIG. 23 shows a concept of mechanically compressing the filter formed by electrodeposition;

FIG. 24 shows the filters before and after the compression;

FIG. 25 is a graph showing a change in the thickness of the filter according to a pressure applied during mechanical compression;

FIG. 26 shows the thickness of the filter according to the pressure applied during mechanical compression;

FIG. 27 shows results of a pilling off test for the filter;

FIG. 28 shows factors affecting the difference pressure in the filter;

FIG. 29 is a structural diagram for performing heat treatment on the filter by using hydrogen gas;

FIG. 30 is a graph showing an average diameter of the metal wire according to temperatures during the filter heat treatment;

FIG. 31 shows a filter heat-treated by using conventional argon gas and hydrogen gas proposed by the present disclosure;

FIG. 32 shows results of a pilling off test for the filter:

FIG. 33 shows the used filters and washed filters;

FIG. 34 is a graph showing the difference pressure changed by washing.

With regard to the description of the drawings, the same or similar reference numerals may be used for the same or similar components.

MODE FOR THE INVENTION

Hereinafter, embodiments disclosed in this specification will be described in detail with reference to the accompanying drawings. The same or similar elements will be denoted by the same reference numerals irrespective of drawing numbers, and repetitive descriptions thereof will be omitted.

Also, in the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present invention are understood to be included in the accompanying drawings.

While terms including ordinal numbers such as the first and the second, etc., can be used to describe various components, the components are not limited by the terms mentioned above. The terms are used only for distinguishing between one component and other components.

When it is said that a component is "connected" or "coupled" to another component, the component may be directly connected to or coupled to that other component, but it should be understood that another component may exist between them. On the other hand, when it is said that a component is "directly connected" or "directly coupled" to another component, it should be understood that no other component may exist between them.

First Embodiment

FIG. 1 shows a concept in which a filter is formed by electrodeposition according to various embodiments of the present disclosure.

Electrodeposition means that electrolyte is released by electrolysis and is adsorbed onto the surface of an electrode.

Referring to FIG. 1, an electrolysis apparatus 100 which includes, for electrodeposition, an electrolytic tank 110 and a power supply 120 is disclosed. The electrolytic tank 110 has a cathode electrode and an anode electrode, and the cathode electrode is connected to the negative (−) terminal of the power supply 120 and the anode electrode is connected to the positive (+) terminal of the power supply 120, respectively. A metal mesh 130 formed by intertwining metal wires is connected to the cathode electrode connected to the negative (−) terminal of the power supply 120, and a metal plate 140 is connected to the electrode connected to the positive (+) terminal of the power supply 120. The metal mesh 130 and the metal plate 140 may be immersed in an aqueous solution 150. According to the embodiment, the metal mesh 130 and the metal plate 140 may be formed by using copper as a material thereof, and the same result can be obtained by using a metallic material other than copper.

According to the embodiment, the aqueous solution 150 may be a halogen aqueous solution. For example, copper bromide ($CuBr_2$) may be dissolved in the aqueous solution, and thus, the aqueous solution may include bromine ions that are halogen elements.

When a voltage is applied by the power supply 120, the metal is decomposed by electrolysis in the metal plate 140 and escapes into the aqueous solution 150. The metal in the aqueous solution 150 adheres to the surface of the metal mesh 130, and thus, metal nano branches can be formed.

FIG. 2 shows an example in which the metal nano branches are formed in the metal mesh 130.

Referring to FIG. 2, halogen ions 151 dissolved in the aqueous solution 150 may be adsorbed onto a metal wire 131 of the metal mesh 130. Here, the halogen ions 151 may not be adsorbed onto the metal wire 131 in any direction, but may be, as shown in (e), adsorbed while forming an angle of 60 degrees with each other in three predetermined directions due to characteristics. Accordingly, the halogen ions 151 can be adsorbed onto the metal wire 131 as shown in (b). Also, metallic elements present in the aqueous solution 150 may be adsorbed onto the halogen ions 151. Accordingly, as shown in (c), the metal is adsorbed onto the halogen ions 151 and grows in three particular directions, and then forms a branch shape. Also, referring to (c), the halogen ions 151 are adsorbed again onto the metal which has grown in three directions in the shape of a branch, and the metal in the aqueous solution 150 is adsorbed again repeatedly onto the halogen ions 151. As a result, a metal nano branch shape shown in (d) can be obtained.

FIG. 3 shows filters formed under various conditions.

Referring to FIG. 3, enlarged views of a unit length of 500 um are shown in (a), (b), and (c), and further enlarged views of the unit length of 2 um are shown in (d), (e), and (f).

Also, a filter formed by a conventional method without using an electrodeposition method is shown in (a) and (d), and a filter formed by using the electrodeposition method when the aqueous solution does not include the halogen ions is shown in (b) and (e). A filter formed by using the electrodeposition method when the aqueous solution includes the halogen ions is shown in (c) and (f).

For electrodeposition, electrolysis was performed for 1,000 seconds by applying a voltage of 0.7 V in 0.2 moles of a sulfuric acid ($H_2SO_4$) aqueous solution. In cases (c) and (f), 0.05 moles of CuBr2 was added to the sulfuric acid aqueous solution.

Referring to (a), (b), and (c) of FIG. 3, it can be seen that the filter formed by electrodeposition by using the aqueous solution including halogen ions proposed in the present disclosure forms a denser filter membrane. Also, referring to (d), (e), and (f, it can be seen that a filter membrane having a thin branch shape is formed only when electrodeposition is performed by using an aqueous solution including the halogen ions proposed in the present disclosure. When the filter membrane has a thin branch shape, an area that comes into contact with particles passing through the filter becomes larger than that of others, so that the possibility of capturing the particles may increase.

FIG. 4 shows the size of an electrodeposition area according to a voltage applied during the electrolysis.

Referring to FIG. 4, when a voltage applied during the electrolysis for electrodeposition is 0.5 V, a long time of 1,500 seconds or more is required to complete the electrodeposition as shown in a graph 410. Meanwhile, when the voltage applied during the electrolysis is 1.5 V as shown in a graph 430, the electrodeposition does not proceed any more but rather decreases due to defects after a specific point of time (e.g., S1 in FIG. 4) because of low mechanical properties.

When the voltage applied during the electrolysis is set to 0.7 V as shown in a graph 420, it can be seen that the electrodeposition is completed within a reasonable time. Therefore, it may be most suitable to apply a voltage around 0.7 V during the electrolysis for forming the filter including the nano branch structure.

FIG. 5 shows the size of the electrodeposition area according to a diameter of the metal wire and a distance between the metal wires used to form the metal mesh 130 formed by intertwining the metal wires.

A graph of FIG. 5 shows the results of the electrodeposition when the size of the metal wires and the distance between the metal wires are as shown in Table 1 below.

TABLE 1

| Graph reference number | Diameter of metal wire(mm) | Distance between metal wires(mm) |
|---|---|---|
| 510 | 0.15 | 0.273 |
| 520 | 0.1 | 0.154 |
| 530 | 0.065 | 0.104 |

As can be seen from Table 1, the larger the graph reference number, the smaller the diameter of the metal wire and the smaller the distance between the metal wires. Accordingly, the metal mesh 130 may be formed more densely as the graph reference number increases. As a result, when the same voltage is applied to perform the electrodeposition, it can be found that the electrodeposition is completed more quickly in the metal mesh 130 in which the metal wires are more densely intertwined. However, referring to the graph 510 and the graph 520, it can be understood that the electrodeposition is completed after a certain period of time even though the metal wires are not more densely intertwined than the graph 530. Therefore, it can be seen that there are no special restrictions on the diameter of the metal wire and the distance between the metal wires in forming the metal mesh 130 which is a basic framework of the filter and it can be seen that the filter can be formed by using the electrodeposition which uses the metal wires having various diameters.

FIG. 6 shows a filtering mechanism according to various embodiments.

Referring to FIG. 6, a particle 610 may be anionized by an ionizer 620 before being incident on the filter. Also, the fine branches of a filter 630 are cationized by a power supply 640 which supplies a positive (+) voltage, and the anionized particles are adsorbed onto the cationized branches of the filter by an electrostatic force. Also, only air without the particles passes. The filter proposed in the present disclosure uses electrostatic force for particle adsorption, thereby providing a much higher removal efficiency than a conventional filter which uses van der Waals force and also providing a low pressure loss.

FIG. 7 shows a test apparatus for testing the performance of the filter manufactured by using the electrodeposition proposed in the present disclosure.

Referring to FIG. 7, the test apparatus 700 includes a test tube 730 in which a trumpet-shaped tubes are connected to a central cylinder in both directions. A filter 710 for a test is provided in the central cylinder. A particle generator 720 for generating particles is provided at the end of the test apparatus in one direction. An ionizer 740 is provided in the middle of a tube extending from the particle generator 720 to the filter 710. A particle counter 750 capable of measuring the concentration of particles introduced through the filter 710 may be provided in the opposite tube in which the particles proceed after passing through the filter 710.

The efficiency of the filter 710 can be calculated as a ratio of a concentration of particles after passing through the filter 710, that is, a concentration of particles in the right chamber to a concentration of particles generated by the particle generator 720, that is, a concentration of particles in the left chamber. The efficiency of the filter can be calculated as a percentage according to Math Figure 1 below.

[Math. 1]
$$\text{Efficiency of Filter (\%)} = \frac{\text{concentration of particle in the right chamber}}{\text{concentration of particle in the left chamber}} \times 100$$

FIG. 8 shows the concentrations of the particles measured by the particle counter after filtering according to various voltages applied to the filter.

In FIG. 8, a graph 810 shows a result when a filter according to a conventional method is used, and graphs 820 to 860 show a result when the filter including nano branches manufactured by using the electrodeposition proposed in the present disclosure is used. The graphs show the results when the voltage applied to the filter is 0 V (820), 2.5 V (830), 5 V (840), 7.5 V (850), and 10 V (860), respectively.

Referring to FIG. 8, it can be seen that, compared to the conventional method, more particles are filtered by the filter including the nano branches manufactured by using the electrodeposition proposed in the present disclosure, so that the particle removal efficiency is significantly better.

Also, referring to FIG. 8, it can be seen that the higher the voltage applied to the filter 710, the better the filtering efficiency. For example, it can be experimentally confirmed that, when a voltage of 0 V is applied to the filter 710, 98.5% of particles are removed, when a voltage of 2.5 V is applied to the filter 710, 99.4% of particles are removed, and a voltage of 10 V is applied to the filter 710, 99.9% of particles are removed.

FIG. 9 shows a shape of the filter after filtering.

In FIG. 9, a case where no voltage is applied to the filter 710 is shown in (a), and a case where a voltage of 10 V is applied to the filter 710. In each figure, the upper figure shows an enlarged view of the shape of the filter when the unit length is 100 μm, and the lower figure shows a further enlarged view of the shape of the filter when the unit length is 5 m. The nano branch structure can be clearly seen in the enlarged view of the shape of the filter when the unit length is 5 μm.

Referring to FIG. 9, it can be seen that more particles have been adsorbed in the case of (b) where a voltage of 10 V is applied, compared to the case of (a) where no voltage is applied.

An additional treatment can be performed on the filter formed after the electrodeposition shown in FIG. 1 is carried out in order to improve the performance of the filter or to remove the harmfulness.

According to various embodiments, a heat treatment may be additionally performed on the filter formed by the electrodeposition. Through the heat treatment, the nano branches are more securely connected to the surrounding branches, so that the mechanical properties can be enhanced.

FIG. 10 shows the nano branch structure of the filter before and after the heat treatment.

In FIG. 10, the nano branch structure of the filter before the heat treatment is shown in (a), and the nano branch structure of the filter after the heat treatment is shown in (b).

Referring to FIG. 10, it can be seen that the nano branch structure of the filter is more clearly seen before the heat treatment while the nano branches of the filter are connected to the surrounding nano branches after the heat treatment. The interconnection of the nano branches of the filter can increase the performance of the filter by eliminating a phenomenon in which current concentrates on a specific branch.

FIG. 11 shows the performance of the filter before and after the heat treatment.

Referring to FIG. 11, it can be seen that a concentration 1110 of the particles which have passed through the filter before the heat treatment is greater than a concentration 1120 of the particles which have passed through the filter after the heat treatment. This indicates that the efficiency of the filter after heat treatment increases.

According to various embodiments, the filter formed by the electrodeposition can be cleaned with hydrochloric acid (HCl). The reason for washing with hydrochloric acid may be to remove potentially harmful bromine which remains in the filter.

FIG. 12 shows the structure of the filter before and after washing with hydrochloric acid.

In FIG. 12, the structure of the filter before washing with hydrochloric acid is shown in (a), and the structure of the filter after washing with hydrochloric acid is shown in (b).

Referring to FIG. 12, the filter cleaned with hydrochloric acid has thinner branches than that of the filter before being cleaned (see reference numeral 1210), and defects 1220 such as a hole may occur in some regions. This may reduce the efficiency of the filter. However, due to the hydrochloric acid washing, there is an effect of reducing the ratio of bromine in the filter from 7% to 3%, and accordingly, it is possible to reduce the harmfulness of the filter.

FIG. 13 shows the performance of the filter before and after washing with hydrochloric acid.

Referring to FIG. 13, it can be seen that a concentration 1310 of particles which have passed through the filter not cleaned with hydrochloric acid is less than a concentration 1320 of particles which have passed through the filter cleaned with hydrochloric acid. This indicates that the efficiency of the filter cleaned with hydrochloric acid is reduced.

According to another embodiment, both the heat treatment and hydrochloric acid washing may be applied to the filter.

FIG. 14 shows the performance of the filter to which both the heat treatment and hydrochloric acid washing are applied.

Referring to FIG. 14, a concentration 1440 of particles which have passed through the filter to which both the heat treatment and hydrochloric acid washing have been applied may be almost similar to a concentration 1410 of particles which have passed through the filter to which neither the heat treatment nor hydrochloric acid washing have been applied. Therefore, by applying the heat treatment and hydrochloric acid washing, the filter can remove harmful bromine, enhance mechanical properties, and continue to maintain high filter efficiency. A graph 1420 may represent the concentration of particles which have passed through the filter to which the hydrochloric acid washing has been applied, and a graph 1430 may represent the concentration of particles which have passed through the filter to which only the heat treatment has been applied.

FIG. 15 is a flowchart showing a process of manufacturing the filter by using the electrodeposition according to various embodiments.

Referring to FIG. 15, in step S100, a filter manufacturing apparatus including the electrolytic tank may connect the metal mesh in which the metal wires are intertwined to the cathode electrode connected to the negative (−) terminal of the power supply, and may connect the metal plate to the anode electrode connected to the positive (+) terminal of the power supply. Here, the metal wire and the metal plate may be formed of the same metallic material (e.g., copper).

In step S200, an aqueous solution including halogen ions may be added to the electrolytic tank. Here, the aqueous solution may be added to submerge the metal mesh and the metal plate. According to the embodiment, the halogen ions can be included in the aqueous solution by dissolving copper bromide ($CuBr_2$) in a sulfuric acid ($H_2SO_4$) aqueous solution. Also, other halogen ions may be included in the aqueous solution.

In step S300, the electrolysis can be performed by applying electric power to the cathode electrode and the anode electrode by using the power supply. The metallic element separated from the metal plate by the electrolysis is adsorbed onto the metal mesh, so that a filter can be formed. Here, the halogen ions included in the aqueous solution can induce the metallic element to be adsorbed in the form of a branch when the metallic element is adsorbed onto the metal wire of the metal mesh.

Additionally, in step S400, the heat treatment and/or hydrochloric acid washing may be performed on the filter formed in step S300.

The heat treatment enables the nano branches constituting the filter to be connected to each other. Accordingly, during the filtering operation, the current applied to the filter is prevented from concentrating on a specific branch and spreads evenly across the entire nano branch, so that it is possible to improve the efficiency of the filter.

The hydrochloric acid washing process can remove harmful halogen elements contained in the filter. However, the hydrochloric acid washing process makes the nano branches of the filter thin and may cause holes in some areas, which may reduce the efficiency of the filter.

When both the heat treatment and hydrochloric acid washing are performed, a filter having a similar performance to that of the filter formed in step S300 may be formed. Therefore, in the case of the heat treatment and hydrochloric acid washing, it is possible to remove harmful halogen elements and improve the mechanical properties of the filter while maintaining similar performance to that of the filter formed in step S300.

Second Embodiment

The above-described first embodiment proposes a filter which has a branch-shaped nano branch structure because the aqueous solution used in the electrolytic tank includes halogen elements, and a manufacturing method thereof.

A second embodiment proposed in the present disclosure is to manufacture a filter by using an electrodeposition method through voltage application without adding an additive to the aqueous solution of the electrolytic tank. According to the embodiment, the aqueous solution of the electrolytic tank does not include additives such as halogen elements and may include 0.05 moles of copper sulfate and 0.2 moles of sulfuric acid.

In the second embodiment, in order to maximize the anisotropic growth of the nano branch without additives such as halogen, a voltage higher than the voltage used in the first embodiment may be used. In general, copper (Cu) has a face-centered cubic (FCC) crystal structure, and has a feature that current is intensively generated on the family of surface that is the most open surface when a voltage is applied. Therefore, the higher the voltage applied during the electrodeposition, the more current is intensively generated on the family of surface, so that the anisotropic growth of the nano branch can be maximized. For example, while a voltage of 0.7 V is applied to the electrolytic tank in the first embodiment, a voltage of 2.4 V is applied to the electrolytic tank in the second embodiment. Therefore, the anisotropic growth of the nano branch can be maximized. It is proposed that the aqueous solution used in the electrolytic tank includes 0.05 mol of copper sulfate and 0.2 mol of sulfuric acid without halogen elements and a filter is manufactured by using electrodeposition.

FIG. 16 shows filters formed by different applied voltages. FIG. 16 shows the result of forming a filter by varying the applied voltage in a state in which an additive is not added to the aqueous solution of the electrolytic tank.

Enlarged views of unit lengths of 500 um and 5 um are shown in (a), (b), and (c) of FIG. 16. A filter formed when a voltage of 1.2 V is applied during the electrodeposition is shown in (a). A filter formed when a voltage of 2.4 V is applied during the electrodeposition is shown in (b). A filter formed when a voltage of 4.8 V is applied during the electrodeposition is shown in (C).

Referring to FIG. 16, it can be seen that while the uniformity of the filter gradually decreases as the applied voltage increases, the diameter of the metal wire (or nano branch) gradually decreases. For example, the diameter of the metal wire of the filter shown in (a) is 3.1 μm, the diameter of the metal wire of the filter shown in (b) is 2.56 μm, and the diameter of the metal wire of the filter shown in (c) is 1.78 μm. In general, the smaller the diameter of the metal wire of the filter, the higher the filtering performance. Also, it is important that the nano branches grow uniformly in the entire area of the filter. Accordingly, in the second embodiment of the present disclosure, the maximum voltage, i.e., 2.4 V capable of maintaining the uniformity of the filter may be used as the applied voltage.

FIG. 17 shows filters formed during different electrodeposition time intervals. FIG. 17 shows the result of forming a filter by varying the electrodeposition time in a state in which an additive is not added to the aqueous solution of the electrolytic tank.

Enlarged views of unit lengths of 500 um are shown in (a), (b), and (c) of FIG. 17. A filter formed by applying a voltage to the electrolytic tank for 120 seconds is shown in (a). A filter formed by applying a voltage to the electrolytic tank for 300 seconds is shown in (b). A filter formed by applying a voltage to the electrolytic tank for 900 seconds is shown in (C).

Referring to FIG. 17, it can be seen that while the uniformity of the filter is improved as the electrodeposition time increases, the thickness of the filter is gradually increased. For example, the filter shown in (a) has a thickness of 445 m, the filter shown in (b) has a thickness of 464 μm, and the filter shown in (c) has a thickness of 585 μm. In general, the smaller the thickness of the filter, the more efficient it is. Further, it is important that the nano branches grow uniformly in the entire area of the filter. Therefore, in the second embodiment of the present disclosure, it is possible to control the electrodeposition to be performed for a minimum period of time (e.g., 300 s) which can maintain the uniformity of the filter. There may be differences shown in Table 2 below between the filter manufactured when the aqueous solution includes halogen elements and the filter manufactured when the aqueous solution does not include halogen elements.

TABLE 2

|  | Filter including halogen elements | Filter without halogen elements |
| --- | --- | --- |
| Filter efficiency | Very high | Low |
| Difference pressure | High | Low |
| Mechanical properties | Easy to break | Good durability |

Referring to Table 2, as in the first embodiment, the filter manufactured by the electrodeposition in which halogen elements are included in the aqueous solution has a high efficiency due to a high specific surface area and small pores of the thin nano branches but also has a high-pressure loss. Also, the filter has a mechanical property that the branches are very thin and easy to break.

On the other hand, since the filter manufactured by using an aqueous solution without halogen elements has relatively thick branches and large pores, the filter has a relatively low efficiency and a relatively low-pressure loss. Also, the filter may have a good durability because of its relatively thick branches. Moreover, stability can be improved because harmful halogen elements are not used. Meanwhile, by increasing the voltage applied to the filter to about 20 V, the efficiency of the filter can be increased to a level similar to that of the filter manufactured by the method according to the first embodiment. Also, the manufacturing method according to the second embodiment may not require additional manufacturing processes such as a heat treatment and/or hydrochloric acid washing process.

However, in the case of the second embodiment, only when a voltage of 2.4 V is applied during electrolysis and the electrolysis is maintained for 300 seconds or more, an electrodeposit is filled even in the inside of the metal mesh, so that a usable filter can be obtained.

FIG. 18 shows a structure of a filter formed by performing electrodeposition using an aqueous solution including no halogen element.

FIG. 18 shows the structure of a filter formed on the metal mesh 130 when a voltage of 2.4 V is applied between the negative terminal and the positive terminal of the electrolysis and the electrodeposition is performed for 2,880 seconds.

Referring to FIG. 18, since there is no halogen ion which determines the growth direction of a material to be electrodeposited, the structure of the filter formed according to the second embodiment has no branch shape unlike the structure of the filter formed according to the first embodiment. However, it can be understood that the electrodeposit is filled even in the inside of the metal mesh 130 and a usable filter can be obtained.

FIG. 19 shows the performance of the filter manufactured without halogen elements in the aqueous solution.

FIG. 19 shows the performance when the aqueous solution includes halogen elements and a voltage of 5 V (1920) and a voltage of 10 V (1940) are applied to the filter manufactured by the electrodeposition method, and shows the performance when the aqueous solution does not include halogen elements and a voltage of 10 V (1910) and a voltage of 20 V (1930) are applied to the filter manufactured by the electrodeposition method.

Referring to FIG. 19, it can be seen that the performance when the aqueous solution includes halogen elements and a voltage of 10 V (1940) is applied to the filter manufactured by the electrodeposition method is almost similar to the performance when the aqueous solution does not include halogen elements and a voltage of 20 V (1930) is applied to the filter manufactured by the electrodeposition method.

Therefore, according to the second embodiment, it can be seen that a relatively equivalent performance can be achieved by applying a higher voltage to the filter manufactured by using the electrodeposition method so as not to include halogen elements harmful to a human body.

The above-described filter manufacturing method is able to manufacture a simpler and more inexpensive filter than a conventional process by using electrodeposition.

In various embodiments of the present disclosure, a filter is formed based on the anisotropic growth characteristic of copper having an uneven growth rate according to an atomic plane. Therefore, in order to produce a large-area filter, it is important to manufacture the filter which has an uneven growth rate on a micro-nano scale and has a uniform growth rate on a bulk scale (filter overall area scale).

Therefore, in the following, a method for improving the uniformity of the filter is provided. Hereinafter, the method for improving the uniformity of the filter may be applied in the same manner to the filter formed by using the above-described first embodiment and the filter formed by using the above-described second embodiment.

First, in the following embodiment, conditions for improving the uniformity of the large-area filter in the electrodeposition process will be described. The conditions for improving the uniformity of the large-area filter may be derived from simulations shown in FIGS. 20 to 22. For example, in the present disclosure, by using an electrochemical simulation tool, an influence of variables such as whether a single side or both sides of a counter electrode are open or not and a distance between the electrodes, etc., on the uniformity of the result during the electrodeposition process will be described. Also, manufacturing conditions for the large-area filter derived based on the simulation result will be described. A 2D axisymmetric geometry and a tertiary current distribution with electroneutrality (TCD ed) model of software of COSMOL 5.5a are used for the simulation. The used variables are shown in Table 3 below.

TABLE 3

| Variable | Value |
| --- | --- |
| Diffusion coefficient of Cu, $D_{Cu2+}$ | $2 \times 10^{-5}$ cm$^2$/s |
| Limiting current density, $J_{limiting}$ | 250 mA/cm$^2$ |
| Density of Cu, $\rho Cu$ | 8.960 kb/m$^3$ |
| Molar mass of Li, $M_{Cu}$ | 63.55 g/mol |
| Initial concentration of Cu, $_{Cu2+}$ | 50 mol/m$^3$ |
| External electric potential, $\varphi_{ext}$ | −2.4 V |
| Deposition time, s | 720 s |

FIG. 20 shows a simulation environment. For the simulation, as shown in (a), in a state where electrolyte 2010 has a height of 60 mm in a cylindrical electrolytic tank 2000 with a diameter of 140 mm, it is assumed that electrodeposition is performed by using a copper mesh 2006 and a copper plate 2004 with a diameter of 4 inches. Based on this, a geometric structure shown in (b) and a mesh shown in (c) are formed. In the geometry shown in (b), the copper plate may be a counter electrode, and the copper mesh may be a working electrode. Through the simulation, it was confirmed that the number of nodes of the large-area filter is 8,890, the minimum element quality is 0.4428, and the average element quality is 0.9866.

FIGS. 21A, 21B, 21C, and 21D shows simulation graphs when the counter electrode is involved in an electrochemical reaction.

A time-based electrodeposition thickness according to a distance from a central axis when both sides of the counter electrode are involved in the electrochemical reaction is shown in FIG. 21A, and a time-based electrodeposition thickness according to a distance from a central axis when a single side of the counter electrode are involved in the electrochemical reaction is shown in FIG. 21B. An electric field distribution when both sides of the counter electrode are involved in the electrochemical reaction is shown in FIG. 21C, and electric field distribution when a single side of the counter electrode are involved in the electrochemical reaction is shown in FIG. 21D.

Describing the time-based electrodeposition thickness according to the distance with reference to FIG. 21A and FIG. 21B, it can be understood that the electrodeposition thickness when only a single side of the counter electrode is involved in the electrochemical reaction is more uniform than the electrodeposition thickness when both sides of the counter electrode are involved in the electrochemical reaction.

Also, describing the flow of ions with reference to FIG. 21C and FIG. 21D, it can be seen that the ions supplied from the outer surface are concentrated on the outside of the working electrode when both sides of the counter electrode is involved in the electrochemical reaction. On the other hand, it can be seen that the ions are less concentrated on the outside of the working electrode when only a single side of the counter electrode is involved in the electrochemical reaction.

FIGS. 22A, 22B, and 22C show simulation graphs according to a distance between the electrodes when a single side of the counter electrode is involved in the electrochemical reaction.

It is shown in FIGS. 22A, 22B, and 22C that, when only a single side of the counter electrode is involved in the electrochemical reaction in a state where a distance between the counter electrode and the working electrode is 5 mm, 10 mm, and 20 mm, respectively, the time-based electrodeposition thickness according to a distance from the central axis of the working electrode and the electric field distribution according to a distance from the central axis of the working electrode.

Referring to FIGS. 22A, 22B, and 22C, describing the electrodeposition type according to the distance between the counter electrode and the working electrode, it can be seen that a flat surface having a constant electrodeposition thickness exists within a certain distance section from the central axis. Also, it can be seen that the shorter the distance between the counter electrode and the working electrode, the longer the flat surface section. For example, it can be understood that, when the distance between the counter electrode and the working electrode is, as shown in FIG. 22A, the smallest (5 mm), the flat surface section is the longest, and when the distance between the counter electrode and the working electrode is, as shown in FIG. 22C, the greatest (20 mm), the flat surface section is the shortest.

Through the above-described simulations as shown in FIGS. 20 to 22C, it can be found that the narrower the distance between the copper plate, that is, the counter electrode and the copper mesh, that is, the working electrode in the electrodeposition process, the higher the uniformity of the formed filter. It can also be found that the uniformity of the filter can be further improved by involving a single side of the copper plate in the electrochemical reaction than by involving both sides of the copper plate in the electrochemical reaction.

Therefore, in the embodiment of the present disclosure, in order to improve the uniformity of the filter, the distance between the copper plate (or metal plate) and the copper mesh (or metal mesh) is set as narrow as about 5 mm, and only a single side of the copper plate is involved in the electrodeposition process. According to the embodiment, one of both sides of the copper plate is opened and the other side is closed, so that only one side of the copper plate can be involved in the electrochemical reaction. For example, one of both sides of the copper plate can be closed so as not to be exposed to the outside by using a material which does not cause an electrochemical reaction in the electrolytic tank.

Next, in the following embodiment, a method for improving the uniformity of the filter after the filter is formed through the electrodeposition process will be described.

According to the embodiment, the uniformity of the large-area filter can be improved by mechanical compression on the filter.

FIG. 23 shows a concept of mechanically compressing the filter formed by electrode-position.

Referring to FIG. 23, a filter formed by electrodeposition is shown in (a), and a mechanical compression process on the filter is shown in (b). The filter deformed by the compression is shown in (c).

A filter 2301 formed by electrodeposition shown in (a) of FIG. 23 is, as shown in (b), disposed between a first and second silicon pads 2311 and 2312, and the filter 2301 between the first and second silicon pads 2311 and 2312 is compressed by using at least one roller 2321, so that a filter 2331 deformed by the compression can be, as shown in (c), obtained. The roller 2321 may be a heating roller including a heater therein. According to the embodiment, the filter 2301 can be mechanically compressed by allowing the heating rollers to be rolled on each of both sides of the filter 2301.

FIG. 24 shows the filters before and after the compression.

FIG. 24 shows a state in which one side 2421 of a filter 2401 formed by electrodeposition is compressed by rolling of a heating roller 2403 and the other side 2411 is not compressed by the heating roller 2403. Also, in FIG. 24, enlarged views 2413 and 2423 show one surface of the other side 2411 not compressed by the rolling of the heating roller 2403 and one surface of the one side 2421 compressed by the rolling of the heating roller 2403, enlarged views 2415 and 2425 show a side surface of the other side 2411 not compressed by the rolling of the heating roller 2403 and a side surface of the one side 2421 compressed by the rolling of the heating roller 2403.

In FIG. 24, through the enlarged views 2413 and 2423, it can be seen that the uniformity of the filter compressed by the rolling of the heating roller 2403 is further improved than that before the filter is compressed. Also, through the enlarged views 2415 and 2425, it can be seen that the thickness of the filter compressed by the rolling of the heating roller 2403 is smaller than before the filter is compressed.

FIG. 25 is a graph showing a change in the thickness of the filter according to a pressure applied during mechanical compression, and FIG. 26 shows the thickness of the filter according to the pressure applied during mechanical compression.

Referring to FIGS. 25 and 26, it can be seen that, when pressure is applied by mechanical compression, the thickness of the filter becomes smaller, and the uniformity is improved by reducing the thickness deviation.

FIG. 27 shows results of a pilling off test for the filter.

FIG. 27 shows results of performing a pilling off test on the filter by using a slide glass 2703 to which a double-sided adhesive tape 2701 has been adhered.

Referring to FIG. 27, it can be found that a particle dropout rate for the uncompressed filter is 99.803%, a particle dropout rate for the filter compressed by 35 kgf is 11.970%, and a particle dropout rate for the filter compressed with 70 kgf is 11.833%. That is, it can be seen that as the filter is compressed by higher pressure, the particle dropout rate decreases due to the double-sided adhesive tape, thereby obtaining mechanical stability.

Next, in the following embodiments, a method for improving a pressure drop (or difference pressure) of the filter will be described. The difference pressure may mean a pressure difference between an inlet and an outlet of the filter.

The following embodiments may be used together with at least one of the above-described embodiments. For example, the method of improving the difference pressure below may be applied to the compressed filter or filter which has not been compressed.

FIG. 28 shows factors affecting the difference pressure in the filter.

As shown in FIG. 28, the larger the diameter of the metal wire is, the smaller the area of the open portion of the filter is, and accordingly, the difference pressure of the filter may be increased. Therefore, in the following embodiment, a method for increasing a diameter 2801 of the open portion by reducing diameters 2803 and 2813 of the metal wire will be described.

According to the embodiment, in order to improve the difference pressure of the filter, the diameter of the metal wire can be reduced by using hydrogen gas during heat treatment of the filter.

FIG. 29 is a structural diagram for performing heat treatment on the filter by using hydrogen gas.

As shown in FIG. 29, a compressed filter 2911 is disposed on a graphite plate 2913, and the graphite plate 2913 on which the filter 2911 is disposed is disposed in a vacuum tube 2903. In order to perform the heat treatment on the filter, a heating element 2921 and a coil 2923 may be disposed around the vacuum tube 2903 to heat the vacuum tube 2903.

According to the embodiment, when the vacuum tube 2903 is heated, a mixed gas (e.g., $H_2$/Ar gas) including hydrogen gas may be injected into the vacuum tube 2903. When the mixed gas is injected into the vacuum tube 2903, an oxide layer (e.g., CuO, or $Cu_2O$) formed on the surface of the metal plate (e.g., a copper plate) causes a reduction reaction with hydrogen ($CuO+H_2$->$Cu+H_2O_{(g)}$, $Cu_2O+H_2$->$2Cu+H_2O_{(g)}$) and may be changed into pure copper, and thus, the diameter of the metal wire of the metal plate may be reduced. The gas present in the vacuum tube 2903 after the heat treatment may be provided to an air compressor 2905.

FIG. 30 is a graph showing an average diameter of the metal wire according to temperatures during the filter heat treatment.

FIG. 30 shows a graph 3010 when the filter is heat-treated by using conventional argon gas and a graph 3020 when the filter is heat-treated by using hydrogen gas, which is proposed in the present disclosure.

Referring to FIG. 30, it can be understood that, when the filter is heat-treated at 400° C., the diameter of the metal wire when hydrogen gas is used is slightly smaller than the diameter of the metal wire when argon gas is used. Also, it can be understood that, when the filter is heat-treated at 500° C., the diameter of the metal wire when argon gas is used rapidly increased, and when the filter is heat-treated at 600° C. there is no difference between the diameter of the metal wire when hydrogen gas is used and the diameter of the metal wire when argon gas is used. This is because the electrodeposition structure is deformed due to the excessively high temperature.

FIG. 31 shows a filter heat-treated by using conventional argon gas and hydrogen gas proposed by the present disclosure.

Filters heat-treated by using conventional argon gas are shown in (a). (b), and (c) of FIG. 31, and filters heat-treated by using hydrogen gas proposed in the present disclosure are shown in (d), (e), and (f) of FIG. 31.

Referring to FIG. 31, it can be seen that, at 400° C., the diameter of the metal wire of the filter heat-treated by using hydrogen gas is slightly smaller than the diameter of the metal wire of the filter heat-treated by using argon gas. However, it can be seen that the diameter of the metal wire of the filter heat-treated by using hydrogen gas is 1.1 μm at 500° C., which is significantly reduced compared to the diameter of 1.8 μm of the metal wire of the filter heat-treated by using argon gas. It can be seen that, at 600° C., the electrodeposition structure of the filter is deformed, and thus, the diameter of the metal wire increases both when hydrogen gas and argon gas are used.

FIG. 32 shows results of a pilling off test for the filter.

FIG. 32 shows results of performing a pilling off test on the filter by using a slide glass 3220 to which a double-sided adhesive tape 3210 has been adhered.

Referring to FIG. 32, it can be seen that a particle dropout rate for the filter which has not been heat-treated and uncompressed is 99.803%, and a particle dropout rate of the filter on which only compression has been performed at 40 kgf is 11.970%. Also, it can be seen that a particle dropout rate of the filter on which only the heat treatment has been performed at 500° C. is 11.833%, and a particle dropout rate of the filter which has been compressed at 40 kgf and then heat-treated at 500° C. is the lowest of 0.584%. That is, it can be seen that when the compressed filter is heat-treated by using hydrogen gas, mechanical stability can be improved by minimizing the particle dropout rate.

As described above, the filter manufactured by at least one of various methods may be washed for reuse after being used to filter dust. According to the embodiment, by washing the used filter with acetone or hydrogen chloride (HCl), the difference pressure of the filter can be restored to its original state. This is because dust is well soluble in acetone or hydrogen chloride.

FIG. 33 shows the used filters and washed filters. A filter manufactured by using at least one of the methods proposed in the present disclosure is shown in (a) of FIG. 33. A filter obtained by filtering fine dust for 40 minutes is shown in (b) of FIG. 33. A filter washed with purified water is shown in (c). A filter washed with acetone is shown in td). A filter washed with hydrogen chloride is shown in (e).

Referring to FIG. 33, it can be seen that when the filter is washed with acetone or hydrogen chloride, more dust is removed than when the filter is washed with purified water.

FIG. 34 is a graph showing the difference pressure changed by washing. Referring to FIG. 34, it can be understood that a difference pressure 3401 of the filter washed with hydrogen chloride having a flow rate of 2 cm/s, a difference pressure 3403 of the filter washed with hydrogen chloride having a flow rate of 5 cm/s, and a difference pressure 3405 of the filter washed with hydrogen chloride having a flow rate of 10 cm/s are all the same as the difference pressure before the corresponding filter is used. That is, it can be seen that by washing the used filter with hydrogen chloride, the difference pressure of the filter is restored to the difference pressure of an initial manufacturing state.

As described above, according to various embodiments of the present disclosure, a filter can be produced by electrodeposition, and the uniformity of the filter can be enhanced by applying the mechanical compression to the formed filter. Also, by performing a hydrogen gas-based heat treatment on the formed filter and/or the compressed filter, the difference pressure of the filter can be improved. Also, the difference pressure of the used filter can be restored to the initial difference pressure by washing the used filter with acetone or hydrogen chloride.

As described above, according to various embodiments of the present disclosure, a nanoporous Cu Air Filter having antibiotic properties may be manufactured. For example, a filter manufactured according to various embodiments of the present disclosure is able to physically capture fine dust or to capture by using static electricity, and may have reusability, antibacterial properties, and high electrical conductivity according to the properties of copper.

Sequence Listing Free Text

100: Electrolysis apparatus 110: Electrolytic tank
120: Power supply 130: Metal mesh
140: Metal plate 150: Aqueous solution

The invention claimed is:
1. A metal air filter comprising:
 a filter which is formed of a metallic material by electrodeposition and has a nano branch structure;
 an ionizer which conducts particles to be captured by the filter with negative charges; and
 a power supply which supplies a positive voltage for conducting the filter with positive charges and a negative voltage for the ionizer,
 wherein the nano branch structure of the filter is formed by induction of bromide ions comprised in an aqueous solution, wherein the bromide ions are included in the aqueous solution by dissolving copper bromide ($CuBr_2$) in a sulfuric acid ($H_2SO_4$) aqueous solution.
2. The metal air filter of claim 1, wherein the filter is formed by electrodeposition according to electrolysis in an electrolytic tank which comprises a metal mesh attached to a cathode electrode, a metal plate attached to an anode electrode, and the aqueous solution comprising bromide ions.

3. The metal air filter of claim 2, wherein the filter is formed by additionally performing a hydrochloric acid washing process.

4. The metal air filter of claim 2, wherein the positive voltage is 10 V.

5. The metal air filter of claim 2, wherein a voltage which is applied between the cathode electrode and the anode electrode is 0.7 V.

6. The metal air filter of claim 2, wherein the aqueous solution comprises copper sulfate and sulfuric acid, and wherein a voltage which is applied between the cathode electrode and the anode electrode is 2.4 V.

7. The metal air filter of claim 2,
wherein only one of both sides of the metal plate within the electrolytic tank is opened such that only the one of both sides of the metal plate is involved in an electrochemical reaction for the electrodeposition, and wherein a distance between the metal mesh and the metal plate within the electrolytic tank is set to 5 mm.

8. The metal air filter of claim 1, wherein the filter is obtained by additionally performing a mechanical compression process on the filter formed by the electrodeposition.

9. The metal air filter of claim 1, wherein the filter is formed by additionally performing a heat treatment using hydrogen gas on the filter formed by the electrodeposition.

10. The metal air filter of claim 9, wherein the heat treatment using hydrogen gas is performed by disposing, in a vacuum tube, a graphite plate on which the filter formed by the electrodeposition is disposed, by injecting a mixed gas including hydrogen gas into the vacuum tube, and by applying heat to the vacuum tube.

11. A manufacturing method of a metal filter, the manufacturing method comprising:
connecting a metal mesh in which metal wires are intertwined to a cathode electrode of an electrolytic tank;
connecting a metal plate to an anode electrode of the electrolytic tank;
adding an aqueous solution such that the metal mesh and the metal plate of the electrolytic tank are submerged, wherein the aqueous solution comprises bromide ions by dissolving copper bromide ($CuBr_2$) in a sulfuric acid ($H_2SO_4$) aqueous solution; and
forming the metal filter having a nano branch structure induced by the bromide ions by performing electrolysis by applying a voltage between the cathode electrode and the anode electrode of the electrolytic tank.

12. The manufacturing method of claim 11, wherein a voltage which is applied between the cathode electrode and the anode electrode is 0.7 V.

13. The manufacturing method of claim 11, wherein the aqueous solution further comprises copper sulfate and sulfuric acid, and wherein a voltage which is applied between the cathode electrode and the anode electrode is 2.4 V.

14. The manufacturing method of claim 11, wherein the forming the filter further comprises connecting nano branches of the filter obtained by the electrolysis to each other and performing a heat treatment using hydrogen gas in order to reduce diameters of the nano branches.

15. The manufacturing method of claim 11, wherein the forming the filter further comprises performing a hydrochloric acid washing process for removing halogen elements comprised in the filter obtained by the electrolysis.

16. The manufacturing method of claim 11, wherein the forming the filter further comprises performing a mechanical compression process on the filter obtained by the electrolysis.

17. The manufacturing method of claim 11, wherein only one of both sides of the metal plate within the electrolytic tank is opened, and wherein a distance between the metal mesh and the metal plate within the electrolytic tank is set to 5 mm.

18. A filter which is used to filter particles comprised in the air, the filter is formed of a metallic material by electrodeposition and has a nano branch structure formed by induction of bromide ions comprised in an aqueous solution provided by an electrolytic tank for the electrodeposition, wherein bromide ions are included in the aqueous solution by dissolving copper bromide ($CuBr_2$) in a sulfuric acid ($H_2SO_4$) aqueous solution.

19. The filter of claim 18, wherein the nano branches of the filter are connected to each other by a hydrogen-based heat treatment.

20. The filter of claim 18, wherein bromide ions used to form the filter is are removed by a hydrochloric acid washing process.

21. The filter of claim 18, wherein the filter is formed by the electrodeposition and then is mechanically compressed.

* * * * *